US012464299B2

(12) United States Patent
Qi et al.

(10) Patent No.: US 12,464,299 B2
(45) **Date of Patent: *Nov. 4, 2025**

(54) SYSTEMS AND METHODS FOR SUPPRESSING SOUND LEAKAGE

(71) Applicant: SHENZHEN SHOKZ CO., LTD., Guangdong (CN)

(72) Inventors: Xin Qi, Shenzhen (CN); Fengyun Liao, Shenzhen (CN); Jinbo Zheng, Shenzhen (CN); Qian Chen, Shenzhen (CN); Hao Chen, Shenzhen (CN); Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 127 days.

This patent is subject to a terminal disclaimer.

(21) Appl. No.: 18/472,442

(22) Filed: Sep. 22, 2023

(65) Prior Publication Data

US 2024/0015453 A1 Jan. 11, 2024

Related U.S. Application Data

(63) Continuation-in-part of application No. 18/308,760, filed on Apr. 28, 2023, now Pat. No. 12,302,066, (Continued)

(30) Foreign Application Priority Data

Jan. 6, 2014 (CN) ......................... 201410005804.0
Oct. 28, 2022 (CN) ......................... 202211336918.4

(Continued)

(51) Int. Cl.
*H04R 25/00* (2006.01)
*G10K 9/13* (2006.01)

(Continued)

(52) U.S. Cl.
CPC ............ *H04R 25/505* (2013.01); *G10K 9/13* (2013.01); *G10K 9/22* (2013.01); *G10K 11/175* (2013.01);

(Continued)

(58) Field of Classification Search
CPC .... H04R 25/505; H04R 1/2811; H04R 9/066; H04R 1/2876; H04R 17/00;

(Continued)

(56) References Cited

U.S. PATENT DOCUMENTS 2,075,196 A 3/1937 Hand
2,327,320 A 8/1943 Shapiro (Continued)

FOREIGN PATENT DOCUMENTS

CN 201616895 U 10/2010
CN 201690580 U 12/2010

(Continued)

OTHER PUBLICATIONS

Decision of Patent Grant in Korean Application No. 10-2016-7017110 mailed on Jun. 14, 2018, 3 pages.

(Continued)

*Primary Examiner* — Tuan D Nguyen
(74) *Attorney, Agent, or Firm* — METIS IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole (Continued)

guides the sound wave inside the housing through the at least one sound guiding hole to an outside of the housing. The guided sound wave interferes with the leaked sound wave in a target region. The interference at a specific frequency relates to a distance between the at least one sound guiding hole and the portion of the housing.

20 Claims, 26 Drawing Sheets

Related U.S. Application Data which is a continuation of application No. 17/804,611, filed on May 31, 2022, now Pat. No. 11,659,341, which is a continuation of application No. 17/170,874, filed on Feb. 8, 2021, now Pat. No. 11,363,392, which is a continuation-in-part of application No. 17/074,762, filed on Oct. 20, 2020, now Pat. No. 11,197,106, which is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978, said application No. 17/170,874 is a continuation-in-part of application No. 16/833,839, filed on Mar. 30, 2020, now Pat. No. 11,399,245, which is a continuation of application No. 15/752,452, filed as application No. PCT/CN2015/086907 on Aug. 13, 2015, now Pat. No. 10,609,496, application No. 18/472,442, filed on Sep. 22, 2023 is a continuation-in-part of application No. 18/332,747, filed on Jun. 11, 2023, which is a continuation of application No. PCT/CN2023/079410, filed on Mar. 2, 2023.

(30) Foreign Application Priority Data

Dec. 1, 2022 (CN) ......................... 202223239628.6
Dec. 30, 2022 (WO) ................ PCT/CN2022/144339

(51) Int. Cl.

| | |
|---|---|
| ***G10K 9/22*** | (2006.01) |
| ***G10K 11/175*** | (2006.01) |
| ***G10K 11/178*** | (2006.01) |
| ***G10K 11/26*** | (2006.01) |
| ***H04R 1/28*** | (2006.01) |
| ***H04R 9/06*** | (2006.01) |
| *H04R 17/00* | (2006.01) |

(52) U.S. Cl.

CPC ............ *G10K 11/178* (2013.01); *G10K 11/26* (2013.01); *H04R 1/2811* (2013.01); *H04R 9/066* (2013.01); *G10K 2210/3216* (2013.01); *H04R 1/2876* (2013.01); *H04R 17/00* (2013.01); *H04R 2460/13* (2013.01)

(58) Field of Classification Search

CPC ......................... H04R 2460/13; H04R 1/1083; H04R 1/1091; H04R 1/1016; H04R 1/1075; H04R 2460/09; G10K 9/13; G10K 9/22; G10K 11/175; G10K 11/178; G10K 11/26; G10K 2210/3216; G10K 11/002; B06B 1/0655

See application file for complete search history.

(56) References Cited

U.S. PATENT DOCUMENTS

| | | | |
|---|---|---|---|
| 4,791,673 | A | 12/1988 | Schreiber |
| 4,987,597 | A | 1/1991 | Haertl |
| 5,280,524 | A | 1/1994 | Norris |
| 5,282,251 | A | 1/1994 | Petersen |
| 5,323,468 | A | 6/1994 | Bottesch |
| 5,430,803 | A | 7/1995 | Kimura et al. |
| 5,673,328 | A | 9/1997 | Wandl et al. |
| 5,692,059 | A | 11/1997 | Kruger |
| 5,757,935 | A | 5/1998 | Kang et al. |
| 5,790,684 | A | 8/1998 | Niino et al. |
| 6,377,697 | B1 | 4/2002 | Cheng |
| 6,456,721 | B1 | 9/2002 | Fukuda |
| 6,668,065 | B2 | 12/2003 | Lee et al. |
| 6,850,138 | B1 | 2/2005 | Sakai |
| 7,400,738 | B2 | 7/2008 | Niederdrank et al. |
| 7,639,825 | B2 | 12/2009 | Fukuda |
| 7,822,215 | B2 | 10/2010 | Carazo et al. |
| 8,141,678 | B2 | 3/2012 | Ikeyama et al. |
| 8,325,964 | B2 | 12/2012 | Weisman |
| 8,340,334 | B2 | 12/2012 | Suyama |
| 8,345,915 | B2 | 1/2013 | Shin et al. |
| 8,433,082 | B2 | 4/2013 | Abolfathi |
| 8,447,061 | B2 | 5/2013 | Lee |
| 8,520,867 | B2 | 8/2013 | Koike et al. |
| 8,526,641 | B2 | 9/2013 | Parker et al. |
| 8,553,910 | B1 | 10/2013 | Dong et al. |
| 8,660,278 | B2 | 2/2014 | Abolfathi et al. |
| 8,699,742 | B2 | 4/2014 | Heiman et al. |
| 8,737,649 | B2 | 5/2014 | Parker et al. |
| 8,908,891 | B2 | 12/2014 | Mersky |
| 9,226,075 | B2 | 12/2015 | Lee |
| 9,253,563 | B2 | 2/2016 | Fukuda |
| 9,729,978 | B2 | 8/2017 | Qi et al. |
| 10,149,071 | B2 | 12/2018 | Qi et al. |
| 10,334,372 | B2 | 6/2019 | Qi et al. |
| 10,506,362 | B1 | 12/2019 | Gomes |
| 10,616,696 | B2 | 4/2020 | Qi et al. |
| 10,631,075 | B1 | 4/2020 | Patil et al. |
| 10,897,677 | B2 | 1/2021 | Walraevens et al. |
| 11,140,497 | B2 | 10/2021 | Liao et al. |
| 11,197,106 | B2 | 12/2021 | Qi et al. |
| 11,323,830 | B2 | 5/2022 | Liao et al. |
| 11,323,832 | B2 | 5/2022 | Liao et al. |
| 11,343,623 | B2 | 5/2022 | Liao et al. |
| 11,343,624 | B2 | 5/2022 | Liao et al. |
| 11,343,625 | B2 | 5/2022 | Liao et al. |
| 11,368,800 | B2 | 6/2022 | Qi et al. |
| 11,399,245 | B2 | 7/2022 | Liao et al. |
| 11,438,717 | B2 | 9/2022 | Liao et al. |
| 11,570,560 | B2 | 1/2023 | Liao et al. |
| 11,582,563 | B2 | 2/2023 | Qi et al. |
| 11,611,837 | B2 | 3/2023 | Liao et al. |
| 2003/0012395 | A1 | 1/2003 | Fukuda |
| 2003/0048913 | A1 | 3/2003 | Lee et al. |
| 2004/0105566 | A1 | 6/2004 | Matsunaga et al. |
| 2004/0131219 | A1 | 7/2004 | Polk, Jr. |
| 2005/0251952 | A1 | 11/2005 | Johnson |
| 2005/0254672 | A1 | 11/2005 | Kobayashi |
| 2006/0098829 | A1 | 5/2006 | Kobayashi |
| 2006/0140435 | A1 | 6/2006 | Sheehy et al. |
| 2006/0165246 | A1 | 7/2006 | Lee et al. |
| 2006/0262954 | A1 | 11/2006 | Lee et al. |
| 2007/0009133 | A1 | 1/2007 | Gerkinsmeyer |
| 2007/0034493 | A1 | 2/2007 | Kawasaki et al. |
| 2007/0041595 | A1 | 2/2007 | Carazo et al. |
| 2007/0053536 | A1 | 3/2007 | Westerkull |
| 2007/0053542 | A1 | 3/2007 | Lee |
| 2007/0237341 | A1 | 10/2007 | Laroche |
| 2008/0107300 | A1 | 5/2008 | Chen |
| 2008/0144874 | A1 | 6/2008 | Wu et al. |

(56) References Cited

U.S. PATENT DOCUMENTS

| | | | |
|---|---|---|---|
| 2009/0095613 | A1 | 4/2009 | Lin |
| 2009/0103768 | A1 | 4/2009 | Lin |
| 2009/0147981 | A1 | 6/2009 | Blanchard et al. |
| 2009/0208031 | A1 | 8/2009 | Abolfathi |
| 2009/0209806 | A1 | 8/2009 | Hakansson |
| 2009/0245553 | A1 | 10/2009 | Parker |
| 2009/0285417 | A1 | 11/2009 | Shin et al. |
| 2009/0290730 | A1 | 11/2009 | Fukuda et al. |
| 2010/0054492 | A1 | 3/2010 | Eaton et al. |
| 2010/0322454 | A1 | 12/2010 | Ambrose et al. |
| 2010/0329485 | A1 | 12/2010 | Fukuda |
| 2011/0150262 | A1 | 6/2011 | Nakama et al. |
| 2012/0020501 | A1 | 1/2012 | Lee |
| 2012/0070022 | A1 | 3/2012 | Saiki |
| 2012/0177206 | A1 | 7/2012 | Yamagishi et al. |
| 2012/0201406 | A1 | 8/2012 | Yamaguchi |
| 2013/0163791 | A1 | 6/2013 | Qi et al. |
| 2013/0259271 | A1 | 10/2013 | Miyoshi et al. |
| 2013/0329919 | A1 | 12/2013 | He |
| 2014/0009008 | A1 | 1/2014 | Li et al. |
| 2014/0064533 | A1 | 3/2014 | Kasic, II |
| 2014/0185822 | A1 | 7/2014 | Kunimoto et al. |
| 2014/0185837 | A1 | 7/2014 | Kunimoto et al. |
| 2014/0274229 | A1 | 9/2014 | Fukuda |
| 2014/0315605 | A1 | 10/2014 | Cho et al. |
| 2014/0355777 | A1 | 12/2014 | Nabata et al. |
| 2015/0030189 | A1 | 1/2015 | Nabata et al. |
| 2015/0195664 | A1 | 7/2015 | Lin et al. |
| 2015/0208183 | A1 | 7/2015 | Bern |
| 2015/0256656 | A1 | 9/2015 | Horii |
| 2015/0264473 | A1 | 9/2015 | Fukuda |
| 2015/0268673 | A1 | 9/2015 | Farzbod et al. |
| 2015/0326967 | A1 | 11/2015 | Otani |
| 2016/0037243 | A1 | 2/2016 | Lippert et al. |
| 2016/0127841 | A1 | 5/2016 | Horii |
| 2016/0150337 | A1 | 5/2016 | Nandy |
| 2016/0165357 | A1 | 6/2016 | Morishita et al. |
| 2016/0295328 | A1 | 10/2016 | Park |
| 2016/0329041 | A1 | 11/2016 | Qi et al. |
| 2017/0201823 | A1 | 7/2017 | Shetye et al. |
| 2017/0223445 | A1 | 8/2017 | Bullen et al. |
| 2018/0167710 | A1 | 6/2018 | Silver et al. |
| 2018/0182370 | A1 | 6/2018 | Hyde et al. |
| 2019/0014425 | A1 | 1/2019 | Liao et al. |
| 2019/0052954 | A1 | 2/2019 | Rusconi Clerici Beltrami et al. |
| 2019/0238971 | A1 | 8/2019 | Wakeland et al. |
| 2019/0320258 | A1 | 10/2019 | Ohura |
| 2020/0196062 | A1 | 6/2020 | Zhang |
| 2020/0228904 | A1 | 7/2020 | Liao et al. |
| 2020/0367008 | A1 | 11/2020 | Walsh et al. |
| 2021/0067857 | A1 | 3/2021 | Struzik |
| 2021/0099027 | A1 | 4/2021 | Larsson et al. |
| 2021/0219059 | A1 | 7/2021 | Qi et al. |
| 2021/0258696 | A1 | 8/2021 | Qi et al. |
| 2022/0124428 | A1 | 4/2022 | Zheng et al. |
| 2022/0240029 | A1 | 7/2022 | Liao et al. |
| 2022/0312108 | A1 | 9/2022 | Zhang et al. |
| 2023/0130211 | A1 | 4/2023 | Li et al. |
| 2023/0179907 | A1 | 6/2023 | Zhang et al. |
| 2024/0276155 | A1 | 8/2024 | Li et al. |

FOREIGN PATENT DOCUMENTS

| | | | | |
|---|---|---|---|---|
| CN | 102014328 | A | 4/2011 | |
| CN | 102421043 | A | 4/2012 | |
| CN | 202435600 | U | 9/2012 | |
| CN | 103167390 | A | 6/2013 | |
| CN | 103347235 | A | 10/2013 | |
| CN | 204206450 | U | 3/2015 | |
| CN | 105007551 | A | 10/2015 | |
| CN | 105101019 | A | 11/2015 | |
| CN | 105101020 | A | 11/2015 | |
| CN | 105142077 | A | 12/2015 | |
| CN | 204887455 | U | 12/2015 | |
| CN | 205142506 | U | 4/2016 | |
| CN | 109547888 | A | 3/2019 | |
| CN | 212909891 | U | 4/2021 | |
| CN | 214014497 | U | 8/2021 | |
| CN | 113573215 | A | 10/2021 | |
| CN | 114286228 | A | 4/2022 | |
| CN | 216357224 | U | 4/2022 | |
| CN | 115175069 | A | 10/2022 | |
| EP | 1261232 | A1 | 11/2002 | |
| EP | 1404146 | A1 | 3/2004 | |
| EP | 1603362 | A1 | 12/2005 | |
| EP | 2779684 | A1 | 9/2014 | |
| EP | 2011367 | B1 | 12/2014 | |
| JP | S5574290 | A | 6/1980 | |
| JP | S5977795 | A | 5/1984 | |
| JP | 07007797 | A | 1/1995 | |
| JP | 2001326986 | A | 11/2001 | |
| JP | 2003264882 | A | 9/2003 | |
| JP | 2004064457 | A | 2/2004 | |
| JP | 2004158961 | A | 6/2004 | |
| JP | 2005151183 | A | 6/2005 | |
| JP | 2006025333 | A | 1/2006 | |
| JP | 2006332715 | A | 12/2006 | |
| JP | 2007129384 | A | 5/2007 | |
| JP | 2007251358 | A | 9/2007 | |
| JP | 2008017398 | A | 1/2008 | |
| JP | 2011160175 | A | 8/2011 | |
| JP | 2013055571 | A | 3/2013 | |
| JP | 2013243564 | A | 12/2013 | |
| JP | 2014072555 | A | 4/2014 | |
| KR | 20010111653 | A | 12/2001 | |
| KR | 20050030183 | A | 3/2005 | |
| KR | 20070122104 | A | 12/2007 | |
| KR | 20090082999 | A | 8/2009 | |
| KR | 20110037483 | A | 4/2011 | |
| KR | 200476572 | Y1 | 3/2015 | |
| WO | 2004095878 | A2 | 11/2004 | |
| WO | 2006088410 | A1 | 8/2006 | |
| WO | 2007034739 | A1 | 3/2007 | |
| WO | WO-2021133679 | A1 * | 7/2021 | ............. H04R 1/105 |

OTHER PUBLICATIONS

International Search Report in PCT/CN2014/094065 mailed on Mar. 17, 2015, 5 pages.

First Office Action in Chinese application No. 201410005804.0 mailed on Dec. 17, 2015, 10 pages.

Communication Pursuant to Article 94(3) EPC in European Application No. 14877111.6 mailed on Apr. 23, 2018, 6 pages.

Notice of Reasons for Rejection in Japanese Application No. 2016-545828 mailed on Oct. 10, 2017, 6 pages.

Decision to Grant a Patent in Japanese Application No. 2016-545828 mailed on Jan. 16, 2018, 5 pages.

The Extended European Search Report in European Application No. 14877111.6 mailed on Mar. 17, 2017, 6 pages.

First Examination Report in Indian Application No. 201617026062 mailed on Nov. 13, 2020, 6 pages.

Written Opinion in PCT/CN2014/094065 mailed on Mar. 17, 2015, 10 pages.

International Search Report in PCT/CN2015/086907 mailed on May 6, 2016, 12 pages.

The Extended European Search Report in European Application No. 15900793.9 mailed on May 17, 2018, 9 pages.

Communication Pursuant to Article 94(3) EPC in European Application No. 15900793.9 mailed on Apr. 10, 2019, 6 pages.

Notice of Reasons for Rejection in Japanese Application No. 2018146019 mailed on Jul. 23, 2019, 10 pages.

Notice of Reasons for Rejection in Japanese Application No. 2018146021 mailed on Jul. 30, 2019, 11 pages.

Notice of Reasons for Rejection in Japanese Application No. 2018-506985 mailed on Sep. 3, 2019, 10 pages.

Decision of Final Rejection in Japanese Application No. 2018-146019 mailed on Jan. 21, 2020, 9 pages.

Communication Pursuant to Article 94(3) EPC in European Application No. 15900793,9 mailed on Apr. 28, 2020, 9 pages.

(56) References Cited

OTHER PUBLICATIONS

Decision to Grant a Patent in Japanese Application No. 2018-146021 mailed on Jul. 21, 2020, 6 pages.
Notice of Reasons for Rejection in Japanese Application No. 2020-088413 mailed on Aug. 3, 2021, 7 pages.
M. Gripper et al., Using the Callsign Acquisition Test (CAT) to Compare the Speech Intelligibility of Air Versus Bone Conduction, International Journal of Industrial Ergonomics, 37(7): 631-641, 2007.
Martin L. Lenhardt et al., Measurement of Bone Conduction Levels for High Frequencies, International Tinnitus Journal, 8(1): 9-12, 2002.
The Extended European Search Report in European Application No. 21186537.3 mailed on Nov. 9, 2021, 9 pages.
Notice of Preliminary Rejection in Korean Application No. 10-2022-7003237 mailed on Apr. 13, 2022, 14 pages.
Notice of Reasons for Rejection in Japanese Application No. 2020-088413 mailed on Sep. 6, 2022, 11 pages.
Notice of Reasons for Rejection in Japanese Application No. 2021-179711 mailed on Oct. 18, 2022, 9 pages.
Notice of Preliminary Rejection in Korean Application No. 10-2022-7003237 mailed on Oct. 11, 2022, 14 pages.
Office Action in Brazilian Application No. 112018002854-1 mailed on Feb. 24, 2023, 8 pages.
Paula Henry et al., Bone Conduction: Anatomy, Physiology, and Communication, Army Research Laboratory, 2007, 206 pages.
Notice of Reasons for Rejection in Japanese Application No. 2020088413 mailed on Apr. 4, 2023, 8 pages.
The Extended European Search Report in European Application No. 24223173.6 mailed on Apr. 30, 2025, 10 pages.
Notice of Rejection in Japanese Application No. 2024-550245 mailed on Sep. 2, 2025, 9 pages.
Notice of Preliminary Rejection in Korean Application No. 10-2024-7028850 mailed on Aug. 25, 2025, 8 pages.

* cited by examiner

SYSTEMS AND METHODS FOR SUPPRESSING SOUND LEAKAGE

CROSS-REFERENCE TO RELATED APPLICATIONS

The present application is a continuation-in-part of U.S. patent application Ser. No. 18/308,760, filed on Apr. 28, 2023, which is a continuation of U.S. patent application Ser. No. 17/804,611 (issued as U.S. Pat. No. 11,659,341), filed on May 31, 2022, which is a continuation of U.S. patent application Ser. No. 17/170,874 (issued as U.S. Pat. No. 11,363,392), filed on Feb. 8, 2021, which is a continuation-in-part application of U.S. patent application Ser. No. 17/074,762 (issued as U.S. Pat. No. 11,197,106), filed on Oct. 20, 2020, which is a continuation-in-part of U.S. patent application Ser. No. 16/813,915 (issued as U.S. Pat. No. 10,848,878), filed on Mar. 10, 2020, which is a continuation of U.S. patent application Ser. No. 16/419,049 (issued as U.S. Pat. No. 10,616,696), filed on May 22, 2019, which is a continuation of U.S. patent application Ser. No. 16/180,020 (issued as U.S. Pat. No. 10,334,372), filed on Nov. 5, 2018, which is a continuation of U.S. patent application Ser. No. 15/650,909 (issued as U.S. Pat. No. 10,149,071), filed on Jul. 16, 2017, which is a continuation of U.S. patent application Ser. No. 15/109,831 (issued as U.S. Pat. No. 9,729,978), filed on Jul. 6, 2016, which is a U.S. National Stage entry under 35 U.S.C. § 371 of International Application No. PCT/CN2014/094065, filed on Dec. 17, 2014, designating the United States of America, which claims priority to Chinese Patent Application No. 201410005804.0, filed on Jan. 6, 2014; U.S. patent application Ser. No. 17/170,874 is also a continuation-in-part application of U.S. patent application Ser. No. 16/833,839 (issued as U.S. Pat. No. 11,399,245), filed on Mar. 30, 2020, which is a continuation of U.S. application Ser. No. 15/752,452 (issued as U.S. Pat. No. 10,609,496), filed on Feb. 13, 2018, which is a national stage entry under 35 U.S.C. § 371 of International Application No. PCT/CN2015/086907, filed on Aug. 13, 2015; the present application is also a continuation-in-part of U.S. patent application Ser. No. 18/332,747, filed on Jun. 11, 2023, which is a continuation of International Patent Application No. PCT/CN2023/079410, filed on Mar. 2, 2023, which claims priority of Chinese Patent Application No. 202211336918.4, filed on Oct. 28, 2022, Chinese Patent Application No. 202223239628.6, filed on Dec. 1, 2022, and International Application No. PCT/CN2022/144339, filed on Dec. 30, 2022. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a panel 121, a transducer 122, and a linking component 123. The transducer 122 may transduce electrical signals to mechanical vibrations. The panel 121 may be connected to the transducer 122 and vibrate synchronically with the transducer 122. The panel 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the panel 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including:

providing a bone conduction speaker including a panel fitting human skin and passing vibrations, a transducer, and a housing, wherein at least one sound guiding hole is located in at least one portion of the housing;

the transducer drives the panel to vibrate;

the housing vibrates, along with the vibrations of the transducer, and pushes air, forming a leaked sound wave transmitted in the air;

the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a panel and a transducer, wherein:

the transducer is configured to generate vibrations and is located inside the housing;

the panel is configured to be in contact with skin and pass vibrations;

At least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 121, panel; 122, transducer; 123, linking component; 210, first frame; 220, second frame; 230, moving coil; 240, inner magnetic component; 250, outer magnetic component; 260; panel; 270, vibration unit; 10, housing; 11, sidewall; 12, bottom; 21, panel; 22, transducer; 23, linking component; 24, elastic component; 30, sound guiding hole; 1700, earphone; 1710, sound production component; 1720, ear hook; 1721, first portion; 1722, second portion; 100, ear; 101, external ear canal; 102, cavum concha; 103, concha boat; 105, antihelix; 107, helix; 112, sound outlet; 113, pressure relief hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
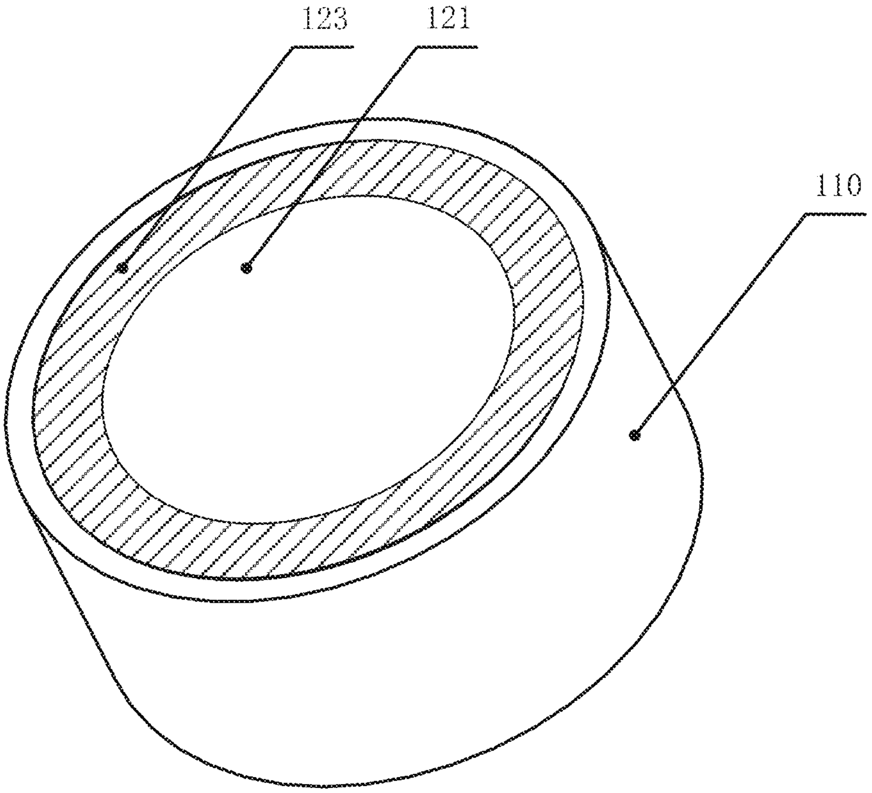
FIGS. 1A and 1B are schematic structures illustrating a bone conduction speaker of prior art.
Figure 1B:
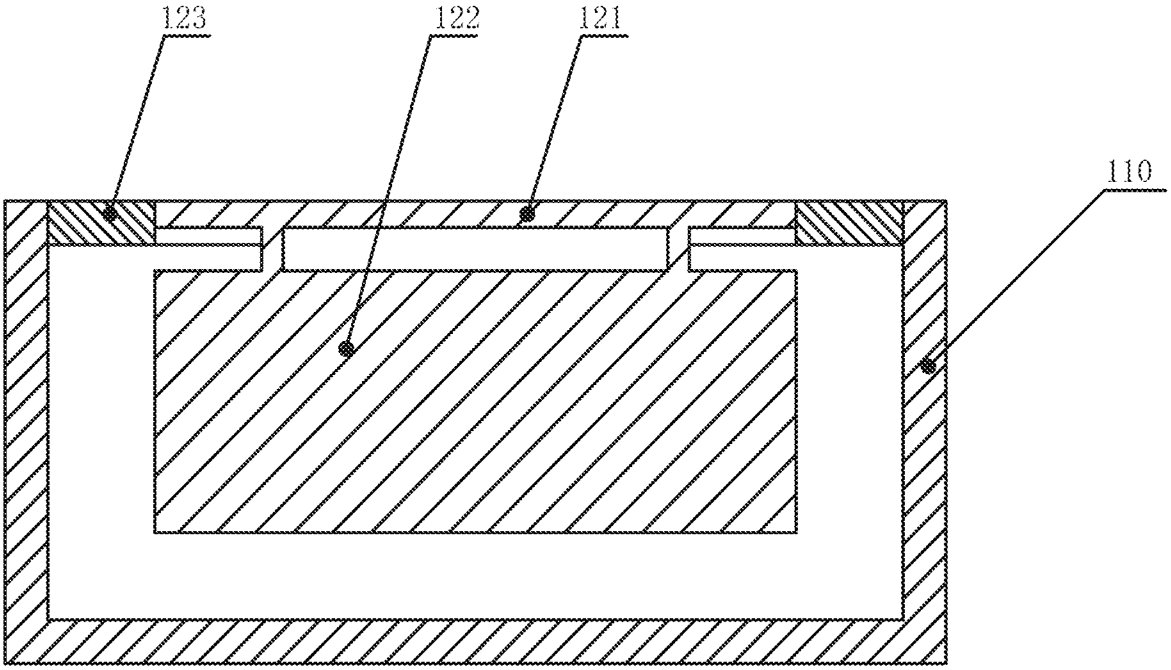
Figure 2:
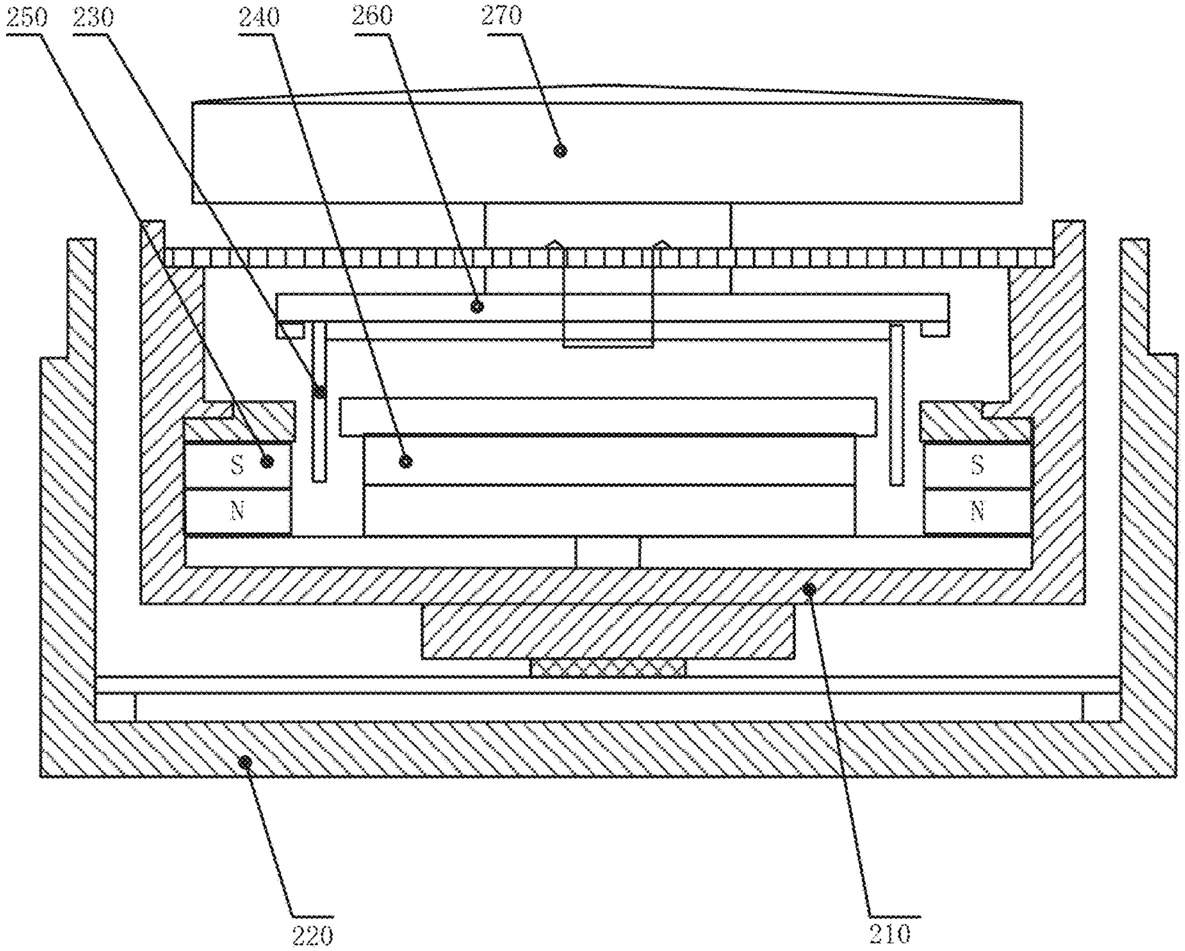
FIG. 2 is a schematic structure illustrating another bone conduction speaker of prior art.
Figure 3:
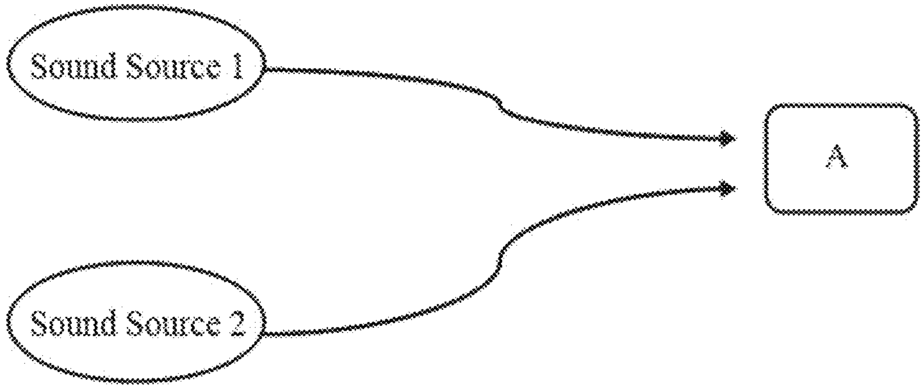
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage. This disclosure also applies above-noted principles of sound wave interference to an air conduction speaker and discloses an air conduction speaker that can reduce sound leakage and/or an earphone including the air conduction speaker.

Embodiment One

Figure 4A:
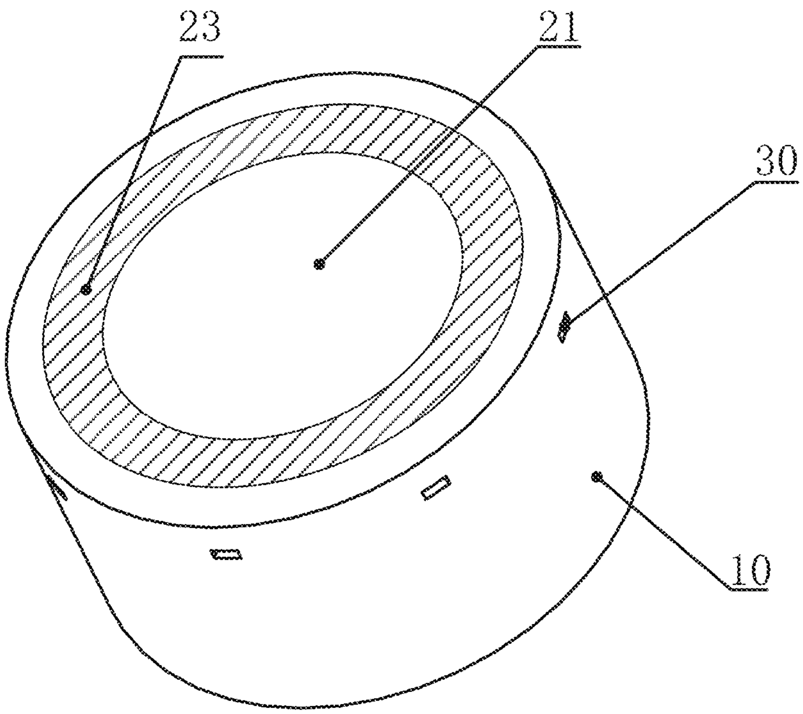
FIGS. 4A and 4B are schematic structures of an exemplary bone conduction speaker according to some embodiments of the present disclosure.
Figure 4B:
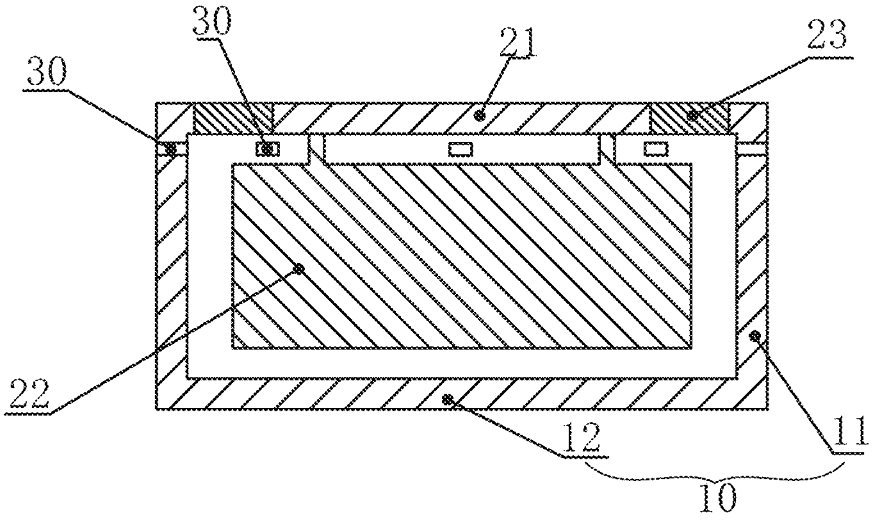

FIGS. 4A and 4B are schematic structures of an exemplary bone conduction speaker. The bone conduction speaker may include a housing 10, a panel 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the panel 21 may be connected to the transducer 22 and configured to vibrate along with the transducer 22. The panel 21 may stretch out from the opening of the housing 10, and touch the skin of the user and pass vibrations to auditory nerves through human tissues and bones, which in turn enables the user to hear sound. In some embodiments, the panel 21 may be in contact with human skin directly, or through a vibration transfer layer made of specific materials (e.g., low-density materials). The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the panel 21 to vibrate. The transducer 22, which resides inside the housing 10, may vibrate. The vibrations of the transducer 22 may drives the air inside the housing 10 to vibrate, producing a sound wave inside the housing 10, which can be referred to as "sound wave inside the housing." Since the panel 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the panel 21) to about the ⅓ height of the sidewall.

Figure 4C:
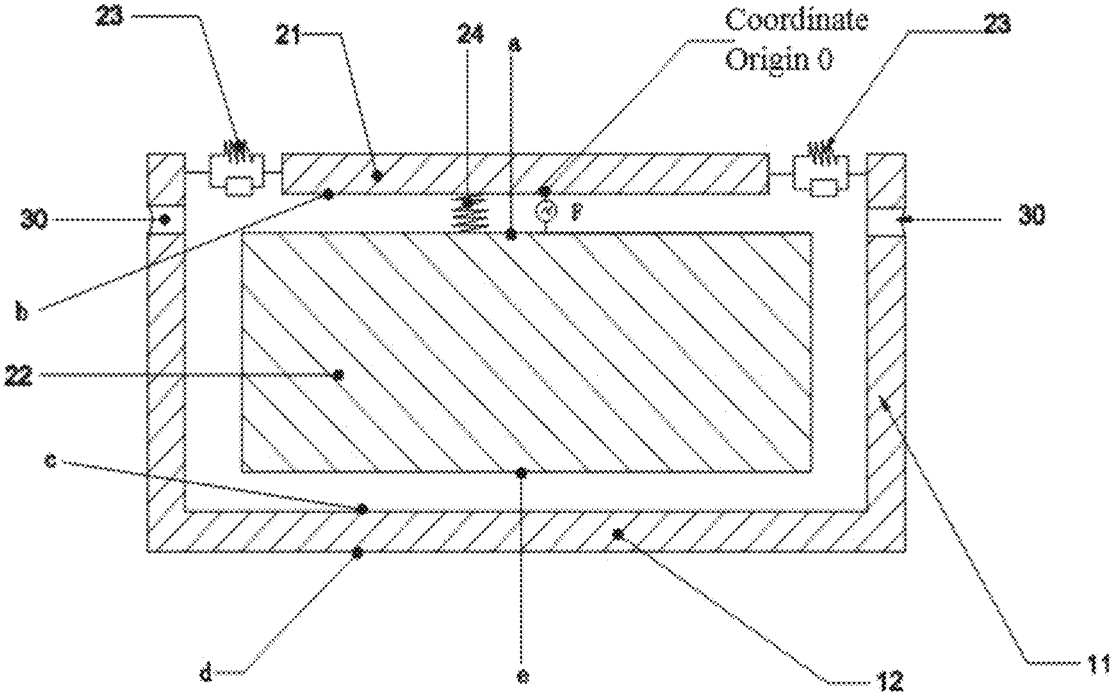
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the panel 21 may be represented by an elastic element 23 and a damping element in the parallel connection. The linking relationship between the panel 21 and the transducer 22 may be represented by an elastic element 24.

Outside the housing 10, the sound leakage reduction is proportional to $$\left(\iint_{S_{hole}} P\,ds - \iint_{S_{housing}} P_d\,ds\right), \tag{1}$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $P=P_a+P_b+P_c+P_e$, (2) wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the panel 21, side b refers to the lower surface of the panel 21 that is close to the transducer 22, side c refers to the inner upper surface of the bottom 12 that is close to the transducer 22, and side e refers to the lower surface of the transducer 22 that is close to the bottom 12.

The center of the side b, O point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \iint_{S_a} W_a(x_a', y_a') \cdot \frac{e^{jkR(x_a', y_a')}}{4\pi R(x_a', y_a')} dx_a' dy_a' - P_{aR}, \tag{3}$$

$$P_b(x, y, z) = -j\omega\rho_0 \iint_{S_b} W_b(x', y') \cdot \frac{e^{jkR(x', y')}}{4\pi R(x', y')} dx' dy' - P_{bR}, \tag{4}$$

$$P_c(x, y, z) = -j\omega\rho_0 \iint_{S_c} W_c(x_c', y_c') \cdot \frac{e^{jkR(x_c', y_c')}}{4\pi R(x_c', y_c')} dx_c' dy_c' - P_{cR}, \tag{5}$$

$$P_e(x, y, z) = -j\omega\rho_0 \iint_{S_e} W_e(x_e', y_e') \cdot \frac{e^{jkR(x_e', y_e')}}{4\pi R(x_e', y_e')} dx_e' dy_e' - P_{eR}, \tag{6}$$

wherein $R(x', y')=\sqrt{(x-x')^2+(y-y')^2+z^2}$ is the distance between an observation point (x, y, z) and a point on side b (x', y', 0); $S_a$, $S_b$, $S_c$ and $S_e$ are the areas of side a, side b, side c and side e, respectively;

$R(x_a',y_a')=\sqrt{(x-x_a')^2+(y-y_a')^2+(z-z_a)^2}$ is the distance between the observation point (x, y, z) and a point on side a ($x_a'$, $y_a'$, $z_a$);

$R(x_c',y_c')=\sqrt{(x-x_c')^2+(y-y_c')^2+(z-z_c)^2}$ is the distance between the observation point (x, y, z) and a point on side a ($x_c'$, $y_c'$, $z_c$);

$R(x_e',y_e')=\sqrt{(x-x_e')^2+(y-y_e')^2+(z-z_e)^2}$ is the distance between the observation point (x, y, z) and a point on side a ($x_e'$, $y_e'$, $z_e$);

$k=\omega/u$ (u is the velocity of sound) is wave number, $\rho_0$ is an air density, $\omega$ is an angular frequency of vibration;

$P_{aR}$, $P_{bR}$, $P_{cR}$ and $P_{eR}$ are acoustic resistances of air, which respectively are:

$$P_{aR} = A \cdot \frac{z_a \cdot r + j\omega \cdot z_a \cdot r'}{\varphi} + \delta, \tag{7}$$

$$P_{bR} = A \cdot \frac{z_b \cdot r + j\omega \cdot z_b \cdot r'}{\varphi} + \delta, \tag{8}$$

-continued $$P_{cR} = A\cdot\frac{z_c\cdot r + j\omega\cdot z_c\cdot r'}{\varphi} + \delta, \tag{9}$$

$$P_{eR} = A\cdot\frac{z_e\cdot r + j\omega\cdot z_e\cdot r'}{\varphi} + \delta, \tag{10}$$

wherein r is the acoustic resistance per unit length, r' is the sound quality per unit length, $z_a$ is the distance between the observation point and side a, $z_b$ is the distance between the observation point and side b, $z_c$ is the distance between the observation point and side c, $z_e$ is the distance between the observation point and side e.

$W_a(x, y)$, $W_b(x, y)$, $W_c(x, y)$, $W_e(x, y)$ and $W_d(x, y)$ are the sound source power per unit area of side a, side b, side c, side e and side d, respectively, which can be derived from following formulas (11):

$$F_e = F_a = F - k_1\cos\omega t - \iint_{S_a} W_a(x,y)dxdy - \iint_{S_e} W_e(x,y)dxdy - f$$

$$F_b = -F + k_1\cos\omega t + \iint_{S_b} W_b(x,y)dxdy - \iint_{S_e} W_e(x,y)dxdy - L$$

$$F_e = F_d = F_b - k_2\cos\omega t - \iint_{S_c} W_c(x,y)dxdy - f - \gamma$$

$$F_d = F_b - k_2\cos\omega t - \iint_{S_d} W_d(x,y)dxdy \tag{11}$$

wherein F is the driving force generated by the transducer 22, $F_a$, $F_b$, $F_e$, $F_d$, and $F_e$ are the driving forces of side a, side b, side c, side d and side e, respectively. As used herein, side d is the outside surface of the bottom 12. $S_d$ is the region of side d, f is the viscous resistance formed in the small gap of the sidewalls, and $f=\eta\Delta s(dv/dy)$.

L is the equivalent load on human face when the panel acts on the human face, $\gamma$ is the energy dissipated on elastic element 24, $k_1$ and $k_2$ are the elastic coefficients of elastic element 23 and elastic element 24 respectively, $\eta$ is the fluid viscosity coefficient, dv/dy is the velocity gradient of fluid, $\Delta s$ is the cross-section area of a subject (board), A is the amplitude, $\varphi$ is the region of the sound field, and $\delta$ is a high order minimum (which is generated by the incompletely symmetrical shape of the housing);

The sound pressure of an arbitrary point outside the housing, generated by the vibration of the housing 10 is expressed as:

$$P_d = -j\omega\rho_0\int\int W_d(x_d', y_d')\cdot\frac{e^{jkR(x_d', y_d')}}{4\pi R(x_d', y_d')}dx_d'dy_d', \tag{12}$$

wherein $R(x_d', y_d') = \sqrt{(x-x_d')^2+(y-y_d')^2+(z-z_d)^2}$ is the distance between the observation point (x, y, z) and a point on side d ($x_d'$, $y_d'$, $z_d$).

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}} Pds$.

In the meanwhile, because the panel 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing may be expressed as $\iint_{S_{housing}} P_d ds$.

The leaked sound wave and the guided sound wave interference may result in a weakened sound wave, i.e., to make $\iint_{S_{hole}} Pds$ and $\iint_{S_{housing}} P_d ds$ have the same value but opposite directions, and the sound leakage may be reduced.

In some embodiments, $\iint_{S_{hole}} Pds$ may be adjusted to reduce the sound leakage. Since $\iint_f Pds$ corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

Additionally, because of the basic structure and function differences of a bone conduction speaker and a traditional air conduction speaker, the formulas above are only suitable for bone conduction speakers. Whereas in traditional air conduction speakers, the air in the air housing can be treated as a whole, which is not sensitive to positions, and this is different intrinsically with a bone conduction speaker, therefore the above formulas are not suitable to an air conduction speaker.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
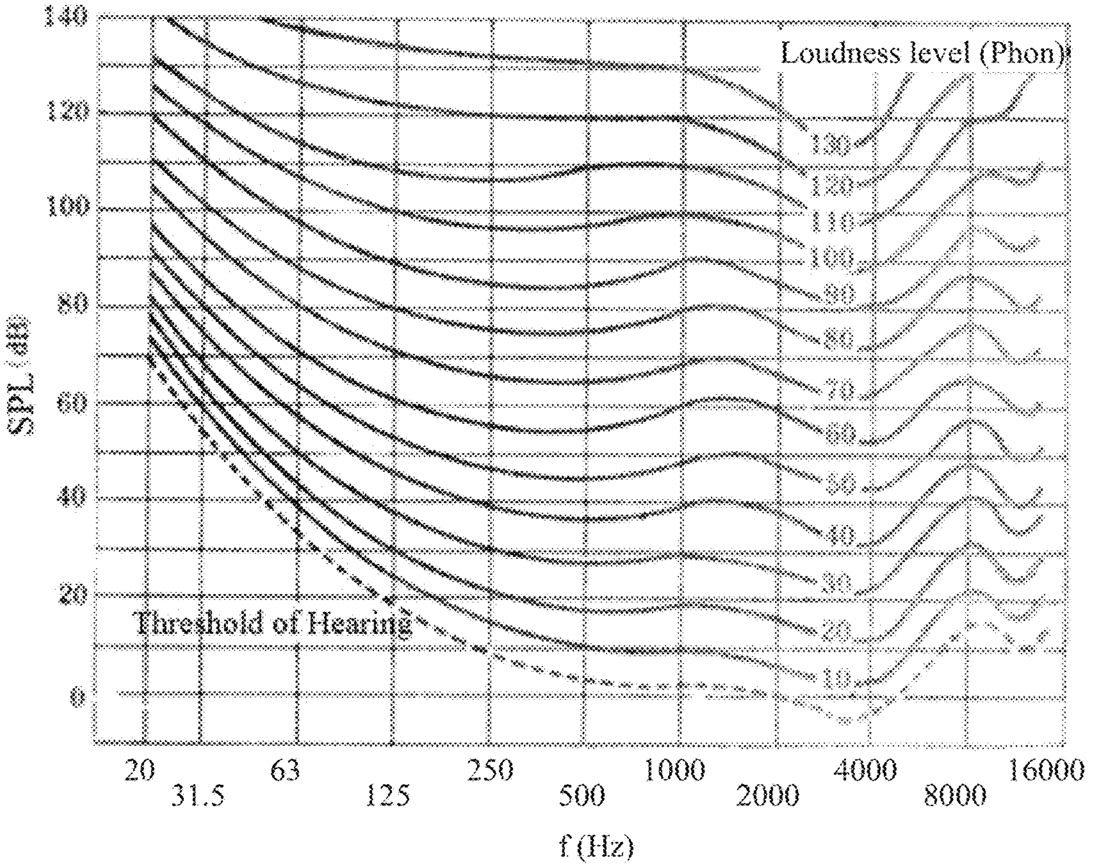
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
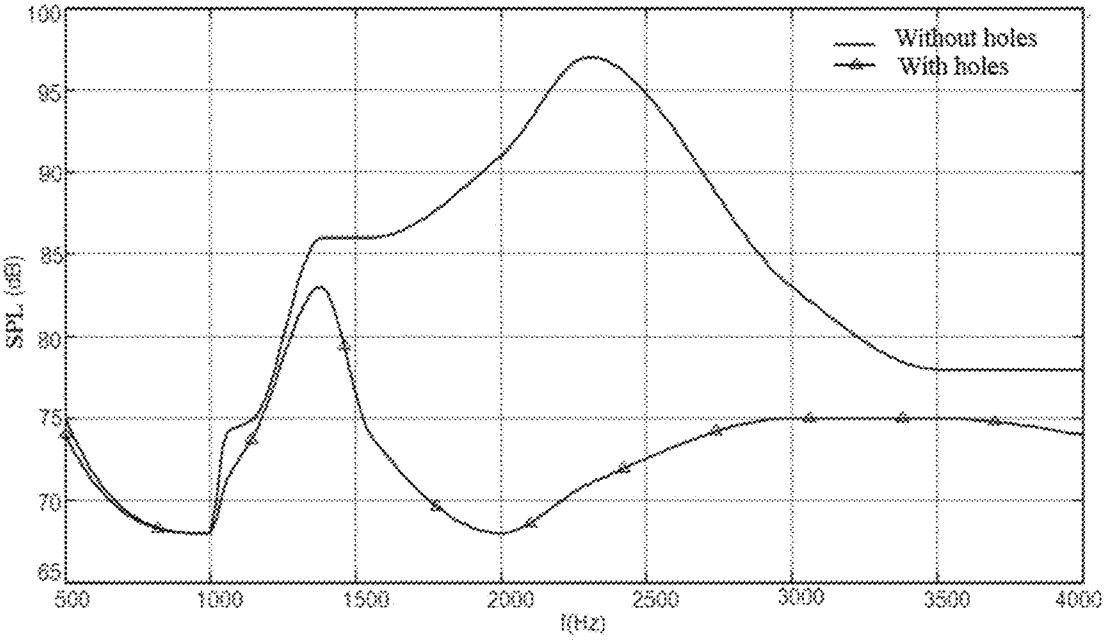
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz~3000 Hz, the sound leakage is reduced by over 10 dB. In the frequency range of 2000 Hz~2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 10. The portion of the housing may be the sidewall 11 of the housing 10 and/or the bottom 12 of the housing 10. Merely by way of example, the leaked sound wave may be generated by the bottom 12 of the housing 10. The guided sound wave output through the sound guiding hole(s) 30 may interfere with the leaked sound wave generated by the portion of the housing 10. The interference may enhance or reduce a sound pressure level of the guided sound wave and/or leaked sound wave in the target region.

In some embodiments, the portion of the housing 10 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 10 is small, the sound guiding hole may be approximately regarded as a point sound source. In some embodiments, any number or count of sound guiding holes provided on the housing 10 for outputting sound may be approximated as a single point sound source. Similarly, for simplicity, the portion of the housing 10 that generates the leaked sound wave may also be approximately regarded as a point sound source. In some embodiments, both the first sound source and the second sound source may approximately be regarded as point sound sources (also referred to as two-point sound sources).

Figure 4E:
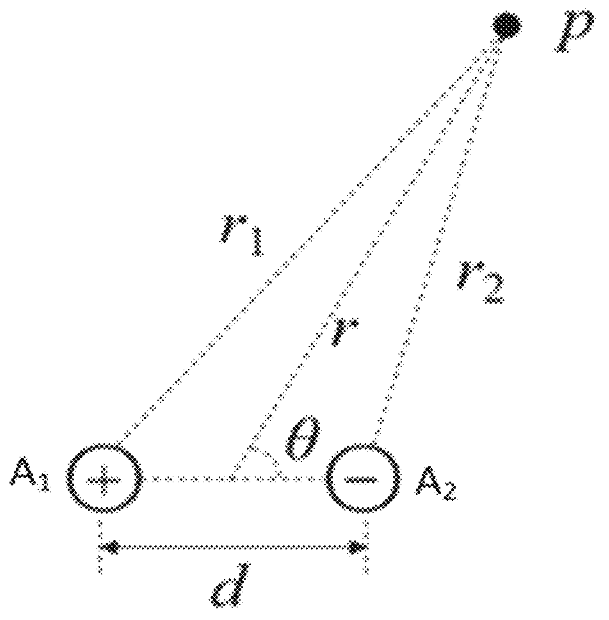
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure p generated by a single point sound source may satisfy Equation (13):

$$p = \frac{j\omega\rho_0}{4\pi r} Q_0 \exp j(\omega t - kr), \tag{13}$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 10 that generates the leaked sound wave is large (e.g., the portion of the housing 10 is a vibration surface or a sound radiation surface), the portion of the housing 10 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 10. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources.

Merely by way of example, the air conduction speaker may include a diaphragm disposed in a cavity formed by a housing of the air conduction speaker. The diaphragm may divide the housing to form a front cavity and a rear cavity. The housing may include a sound outlet (e.g., the sound outlet 112 in FIG. 17) configured to transmit a sound wave generated in the front cavity to the human ear. However, when the air conduction speaker is placed at a position near an ear canal but not blocking the ear canal, the sound wave transmitted by the sound outlet may form a leaked sound wave in the far-field (or a target region). In some embodiments, in order to reduce the amplitude of the leaked sound wave and thus reduce the sound leakage, the housing may further include a pressure relief hole (e.g., the pressure relief hole 113 in FIG. 17) configured to guide a sound wave generated in the rear cavity out of the housing. The sound outlet and the at least one pressure relief hole, also referred to as sound guiding holes of the air conduction speaker, may be treated as the two-point sound sources. The guided sound wave transmitted by the pressure relief hole may form interference with the leaked sound wave generated by the sound outlet in the far-field, so as to reduce the amplitude of the leaked sound, thereby ensuring the sound leakage reduction effect. More descriptions about the sound waves transmitted through the sound outlet 112 and the pressure relief hole 113 may be found elsewhere of the present disclosure, e.g., FIG. 17 and the descriptions thereof.

It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 10 and the sound guiding hole(s) are opposite, that is, an absolute value of the phase difference between the two-point sound sources is 180 degrees, the far-field leakage may be reduced according to the principle of reversed phase cancellation.

In some embodiments, a size (e.g., an area, a depth), a position, etc., of at least one of the two-point sound sources may be adjusted to achieve better sound leakage reduction and/or improve the sound intensity at the ear canal. In some embodiments, the acoustic output device (e.g., the air conduction speaker) may be worn by the user through a suspension structure (e.g., an ear hook 1720 illustrated in FIG. 17). For example, the acoustic output device may be implemented as an earphone including the suspension structure. In some embodiments, the earphone may be configured such that when the earphone is in a wearing state, the sound guiding holes (or the two-point sound sources) meet certain conditions, and the earphone may output different sound effects in the near field and the far field. For example, a connection line of the two-point sound sources may be directed to an ear canal (or a hearing position) of the user such that the user can hear a sufficiently loud sound. As another example, the earphone may be configured such that when the earphone is in a wearing state, the housing 10 may at least partially be located at an antihelix of the user's ear, one of the sound guiding holes (e.g., the sound outlet) may be located at a position at least partially corresponding to the concha boat, and another one of the sound guiding holes (e.g., the at least one sound relief hole) may be located at a position far away from the sound outlet, which may increase listening volume at the listening position and maintain a comparable sound leakage reduction effect. More description regarding the sound guiding holes (e.g., the sound outlet and/or the at least one pressure relief hole) and/or the earphone may be found elsewhere in the present disclosure. See, e.g., FIGS. 17-20B and relevant descriptions thereof.

In some embodiments, the interference between the guided sound wave and the leaked sound wave at a specific frequency may relate to a distance between the sound guiding hole(s) and the portion of the housing 10. For example, if the sound guiding hole(s) are set at the upper portion of the sidewall of the housing 10 (as illustrated in FIG. 4A), the distance between the sound guiding hole(s) and the portion of the housing 10 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
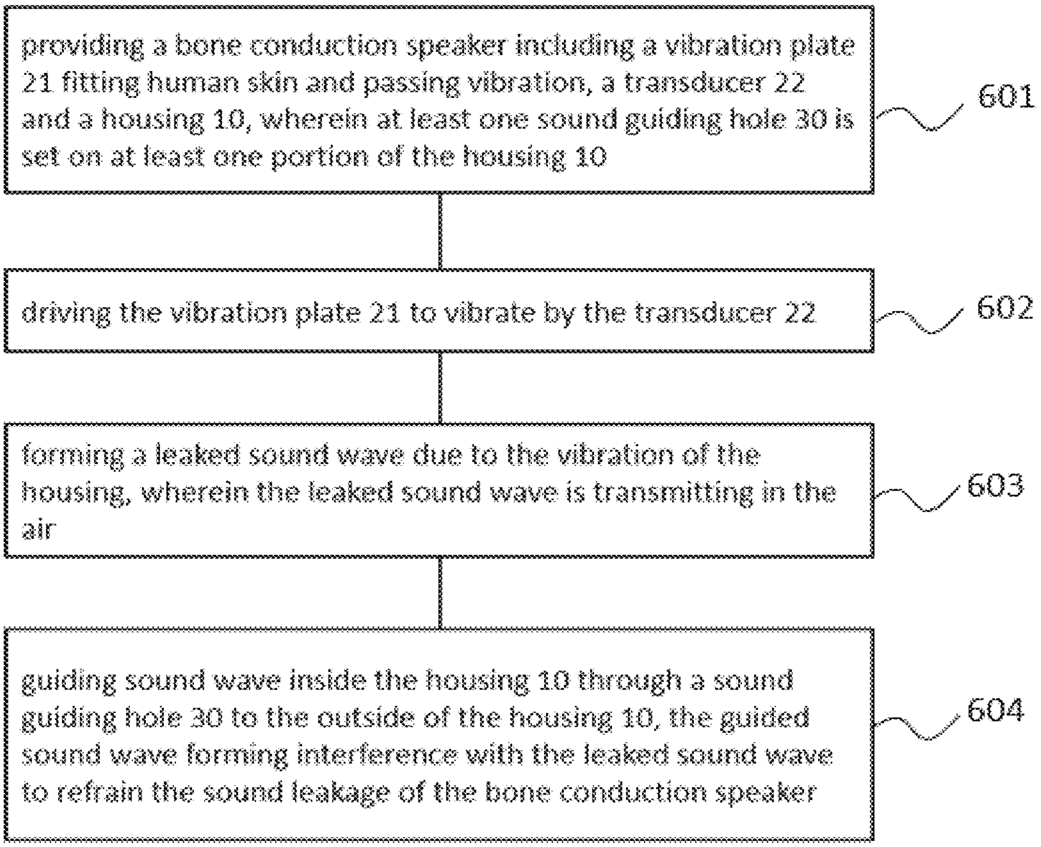
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a panel 21 touching human skin and passing vibrations, a transducer 22, and a housing 10 is provided. At least one sound guiding hole 30 is arranged on the housing 10. At 602, the panel 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
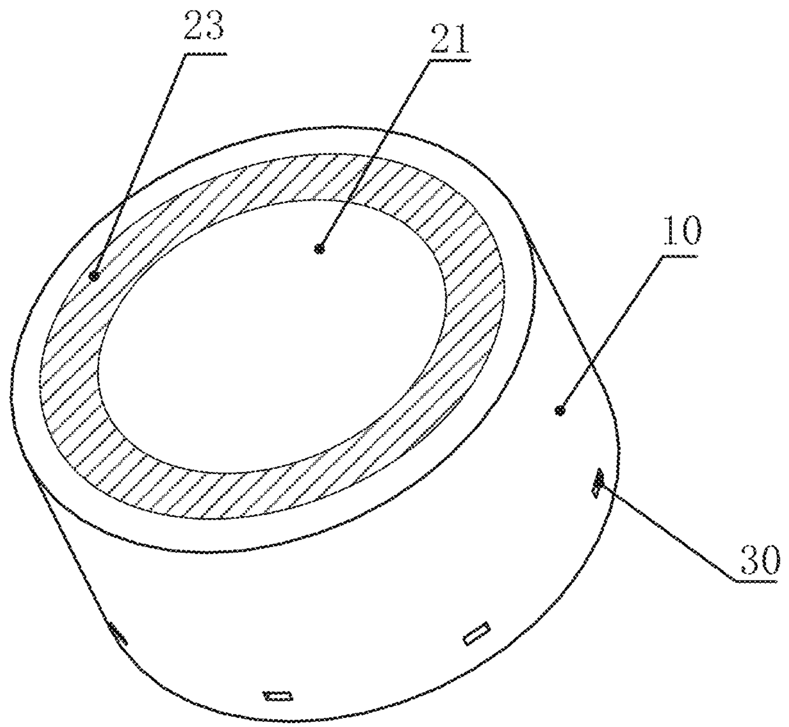
FIGS. 7A and 7B are schematic structures of an exemplary bone conduction speaker according to some embodiments of the present disclosure.
Figure 7B:
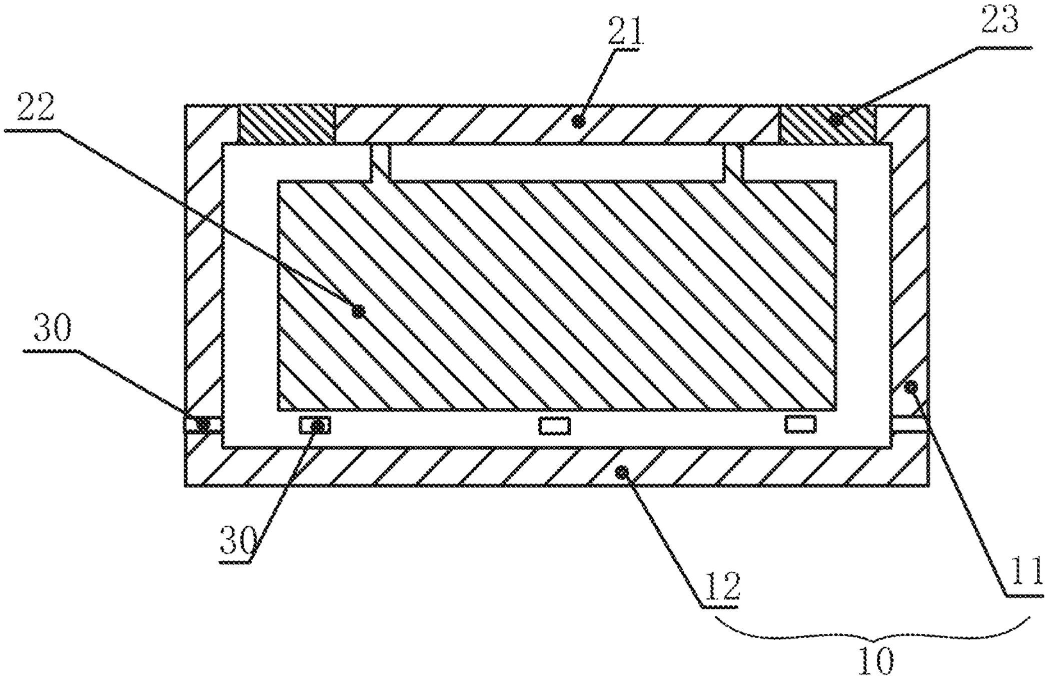

FIGS. 7A and 7B are schematic structures illustrating an exemplary bone conduction speaker according to some embodiments of the present disclosure. The bone conduction speaker may include an open housing 10, a panel 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer 22 may include components such as magnetizer, voice coil, and etc., and the components may be located inside the housing and may generate synchronous vibrations with a same frequency.

Figure 7C:
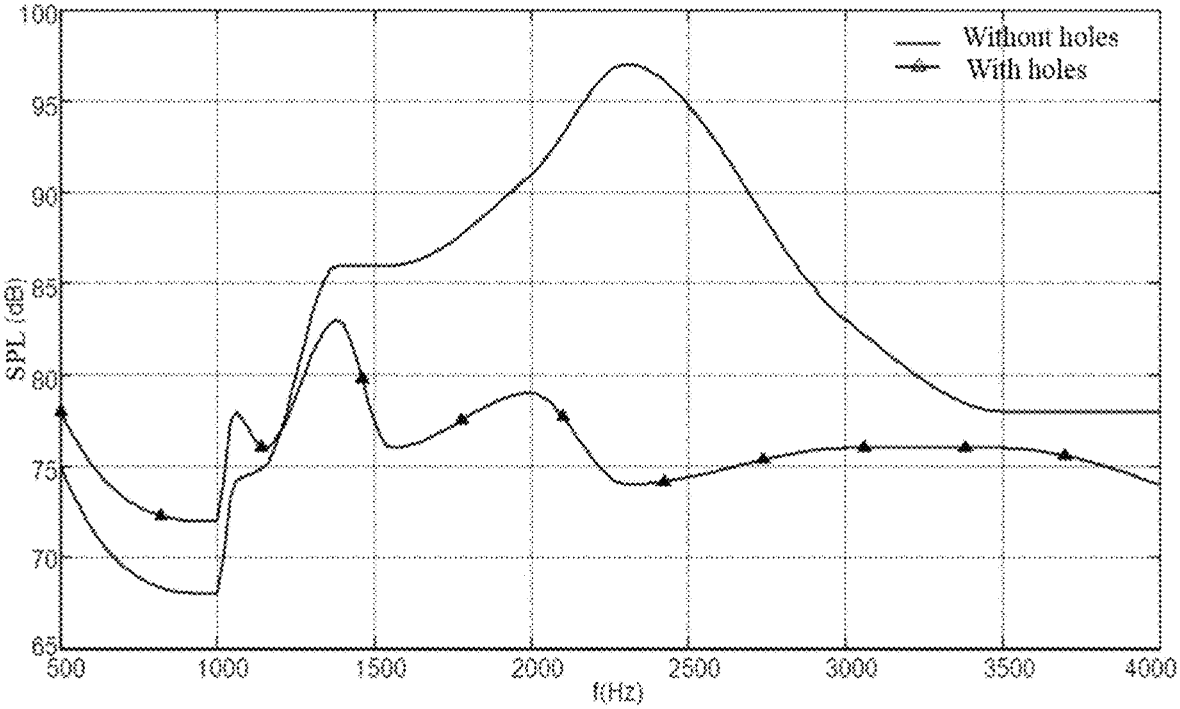
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz~4000 Hz, the sound leakage is reduced by more than 5 dB, and in the frequency range of 2250 Hz~2500 Hz, the sound leakage is reduced by more than 20 dB.

In some embodiments, the sound guiding hole(s) at the lower portion of the sidewall of the housing 10 may also be approximately regarded as a point sound source. In some embodiments, the sound guiding hole(s) at the lower portion of the sidewall of the housing 10 and the portion of the housing 10 that generates the leaked sound wave may constitute two-point sound sources. The two-point sound sources may be formed such that the guided sound wave output from the sound guiding hole(s) at the lower portion of the sidewall of the housing 10 may interfere with the leaked sound wave generated by the portion of the housing 10. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 10. For example, if the sound guiding hole(s) are set at the lower portion of the sidewall of the housing 10 (as illustrated in FIG. 7A), the distance between the sound guiding hole(s) and the portion of the housing 10 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
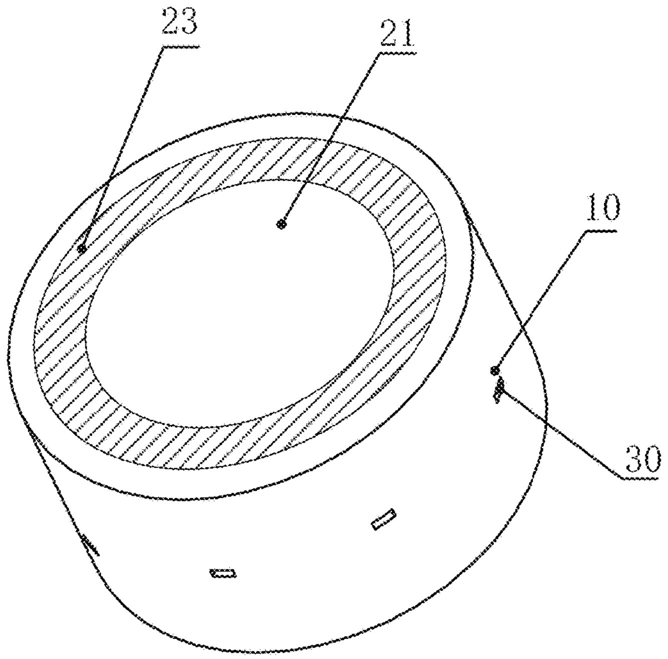
FIGS. 8A and 8B are schematic structure of an exemplary bone conduction speaker according to some embodiments of the present disclosure.
Figure 8B:
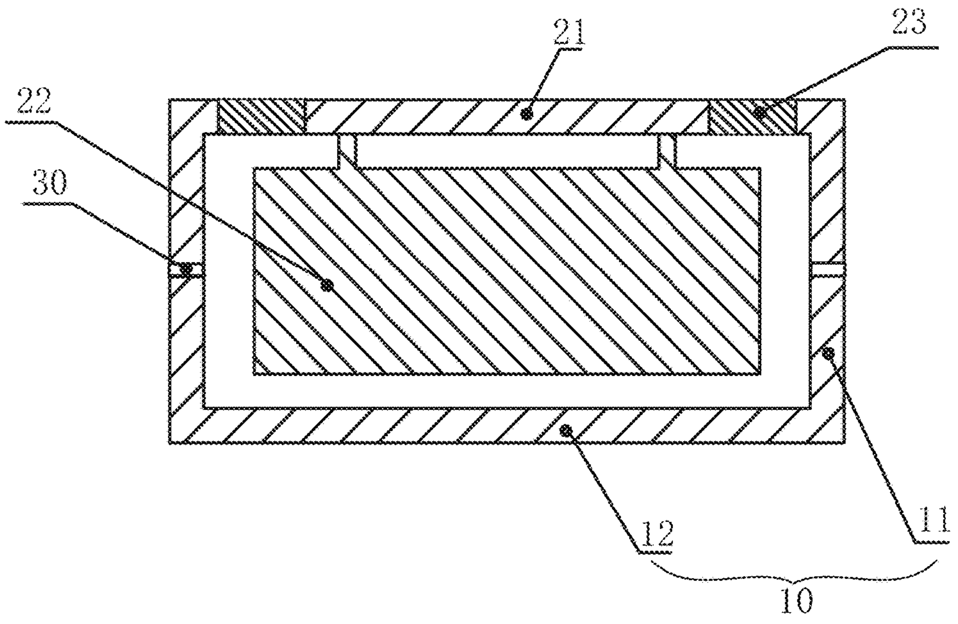

FIGS. 8A and 8B are schematic structures illustrating an exemplary bone conduction speaker according to some embodiments of the present disclosure. The bone conduction speaker may include an open housing 10, a panel 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
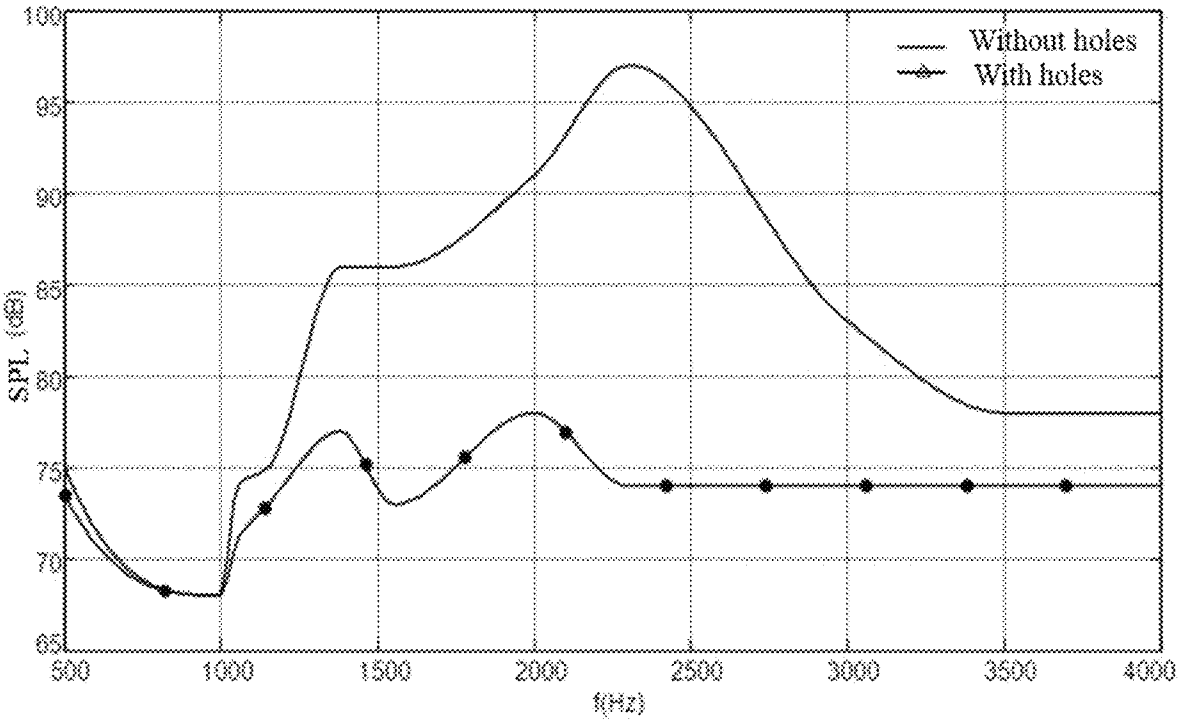
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
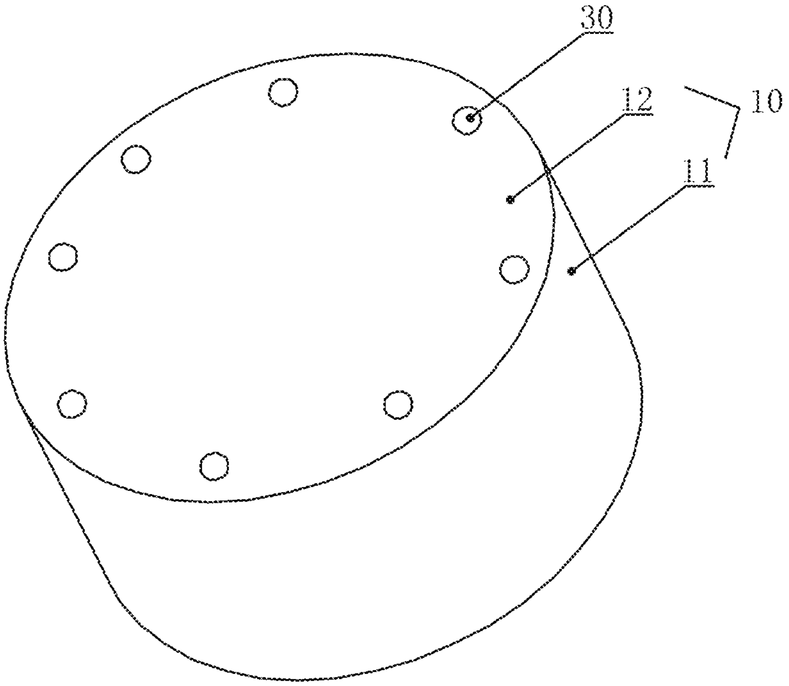
FIGS. 9A and 9B are schematic structures of an exemplary bone conduction speaker according to some embodiments of the present disclosure.
Figure 9B:
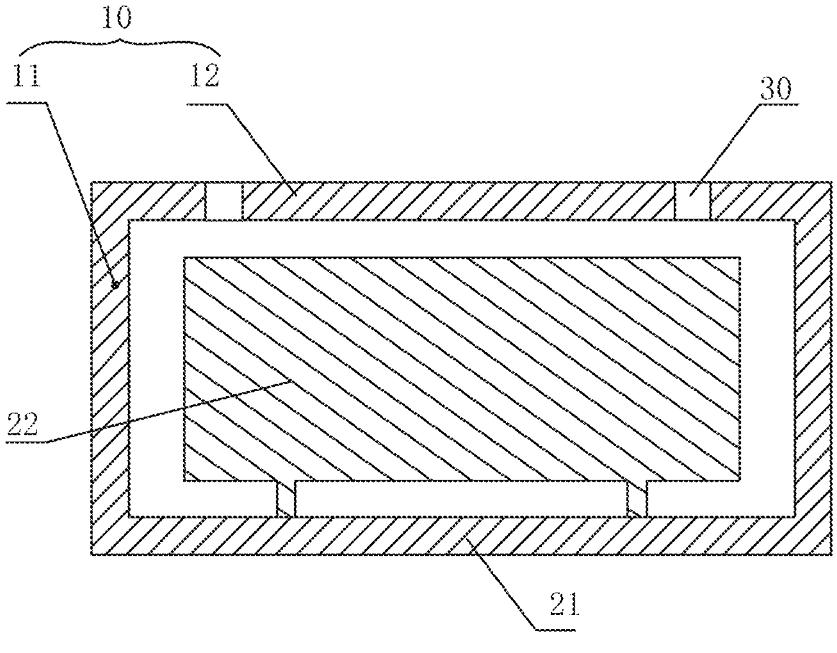

FIGS. 9A and 9B are schematic structures of an exemplary bone conduction speaker according to some embodiments of the present disclosure. The bone conduction speaker may include an open housing 10, a panel 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly of unevenly in one or more circles on the bottom of the housing 10. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
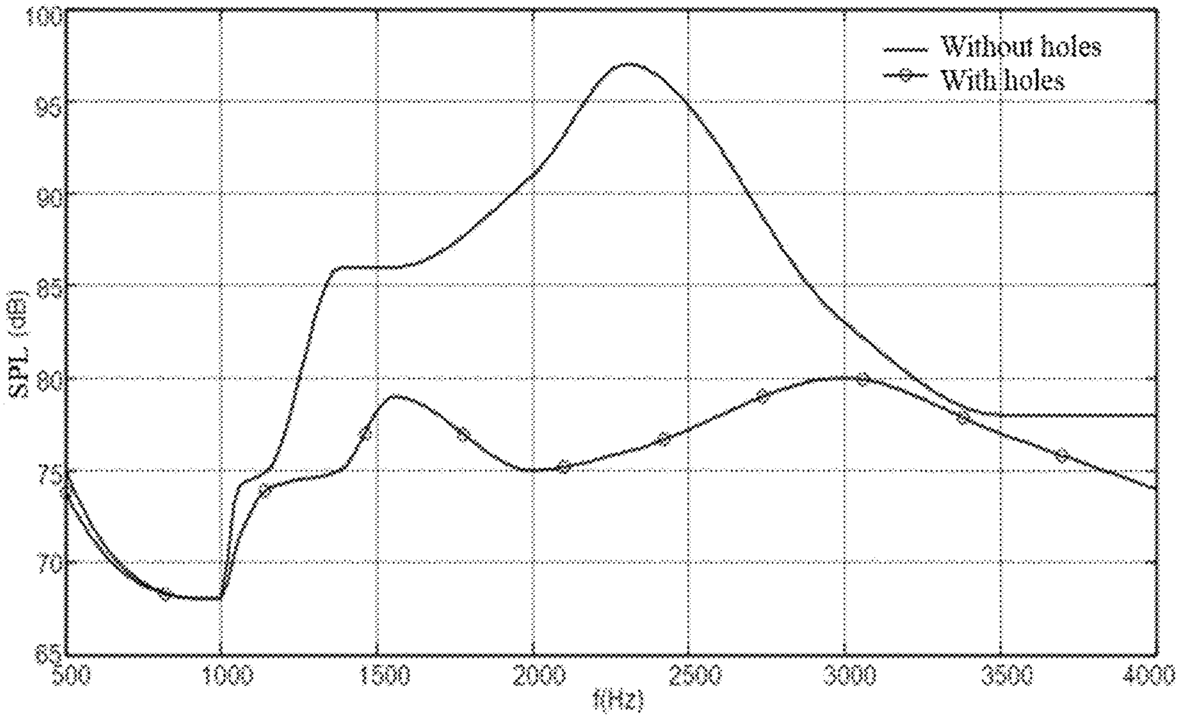
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz~3000 Hz, the effectiveness of reducing sound leakage is outstanding. For example, in the frequency range of 1700 Hz~2700 Hz, the sound leakage is reduced by more than 10 dB; in the frequency range of 2200 Hz~2400 Hz, the sound leakage is reduced by more than 20 dB.

Embodiment Six

Figure 10A:
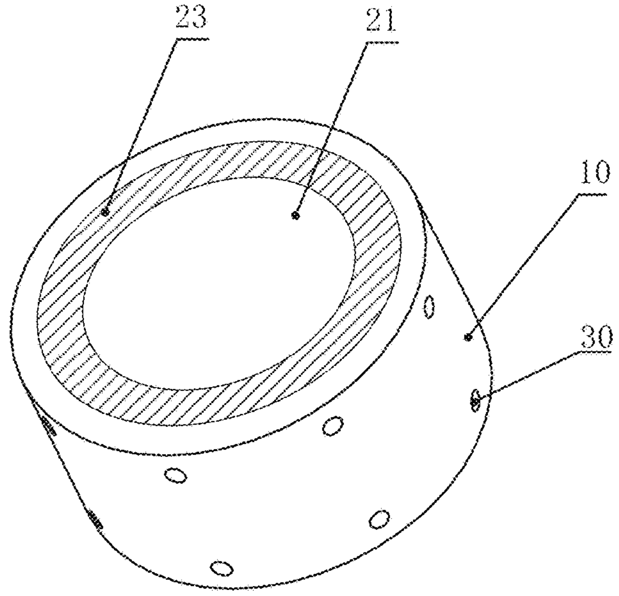
FIGS. 10A and 10B are schematic structures of an exemplary bone conduction speaker according to some embodiments of the present disclosure.
Figure 10B:
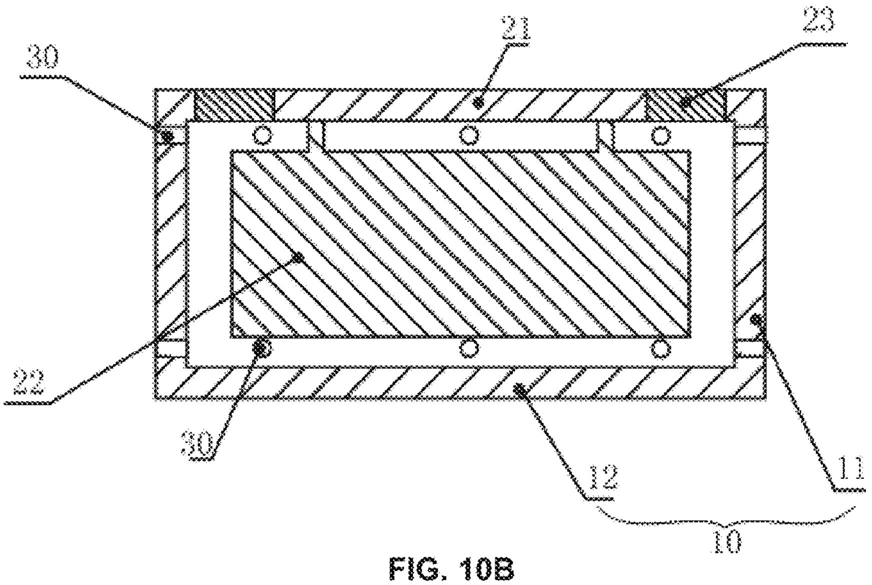

FIGS. 10A and 10B are schematic structures of an exemplary bone conduction speaker according to some embodiments of the present disclosure. The bone conduction speaker may include an open housing 10, a panel 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
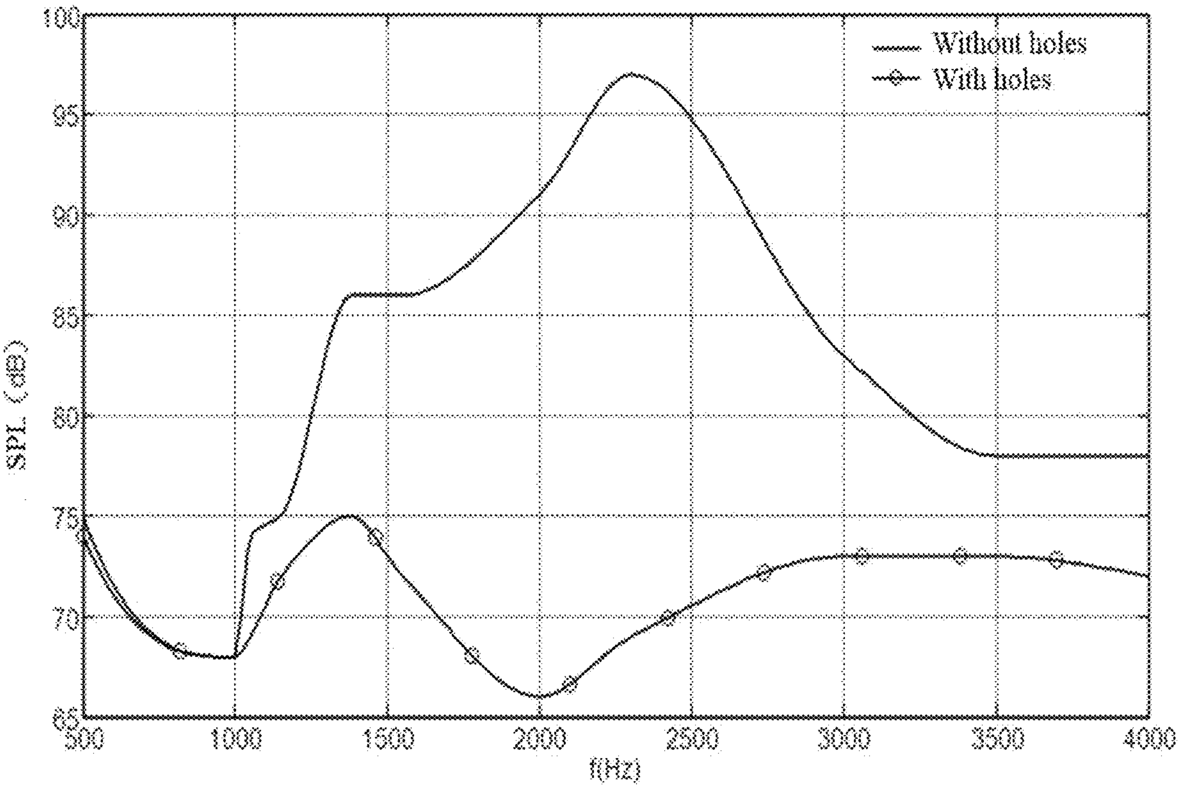
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 10 (also referred to as first hole(s)) may be approximately regarded as a point sound source. In some embodiments, the first hole(s) and the portion of the housing 10 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 10 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 10 (also referred to as second hole(s)) may also be approximately regarded as another point sound source. Similarly, the second hole(s) and the portion of the housing 10 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 10 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
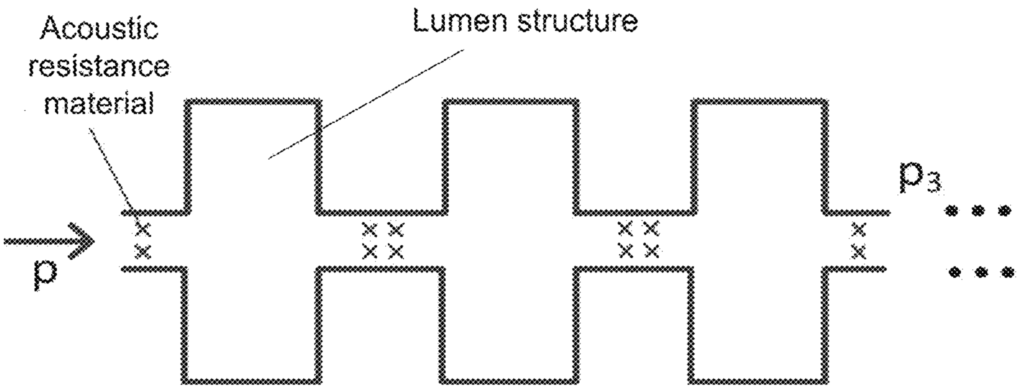
FIG. 10D is a schematic diagram illustrating an acoustic route according to some embodiments of the present disclosure.
Figure 10E:
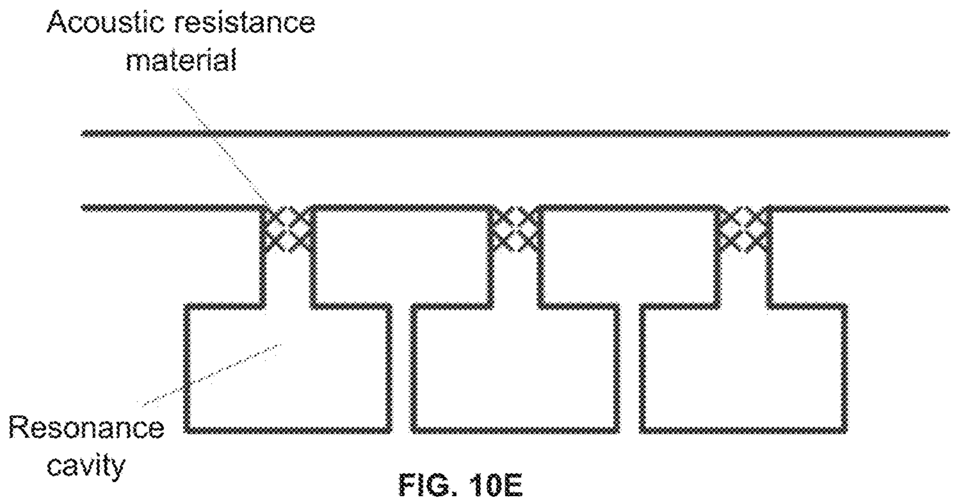
FIG. 10E is a schematic diagram illustrating another acoustic route according to some embodiments of the present disclosure.
Figure 10F:
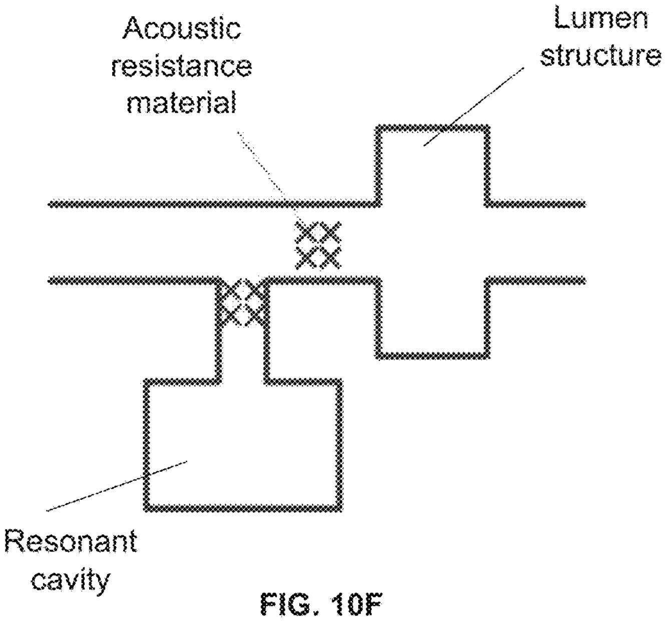
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5MKS Rayleigh to 500MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 10. In some embodiments, the portion of the housing that generates the leaked sound wave may be the bottom of the housing 10. The first hole(s) may have a larger distance to the portion of the housing 10 than the second hole(s). In some embodiments, the frequency of the first guided sound wave output from the first hole(s) (e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 10 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 10 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 10. For example, the leaked sound wave of the first frequency may be generated by the sidewall of the housing 10, the leaked sound wave of the second frequency may be generated by the bottom of the housing 10. As another example, the leaked sound wave of the first frequency may be generated by the bottom of the housing 10, the leaked sound wave of the second frequency may be generated by the sidewall of the housing 10. In some embodiments, the frequency of the leaked sound wave generated by the portion of the housing 10 may relate to parameters including the mass, the damping, the stiffness, etc., of the different portion of the housing 10, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 10, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
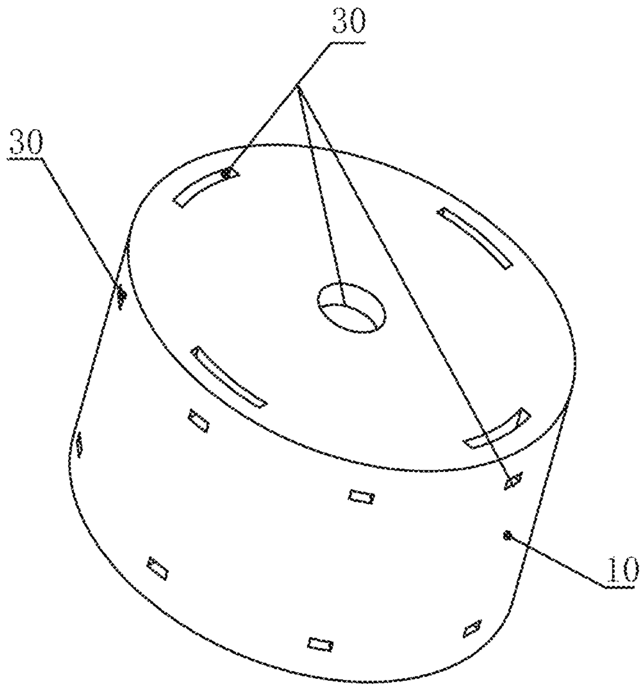
FIGS. 11A and 11B are schematic structures of an exemplary bone conduction speaker according to some embodiments of the present disclosure.
Figure 11B:
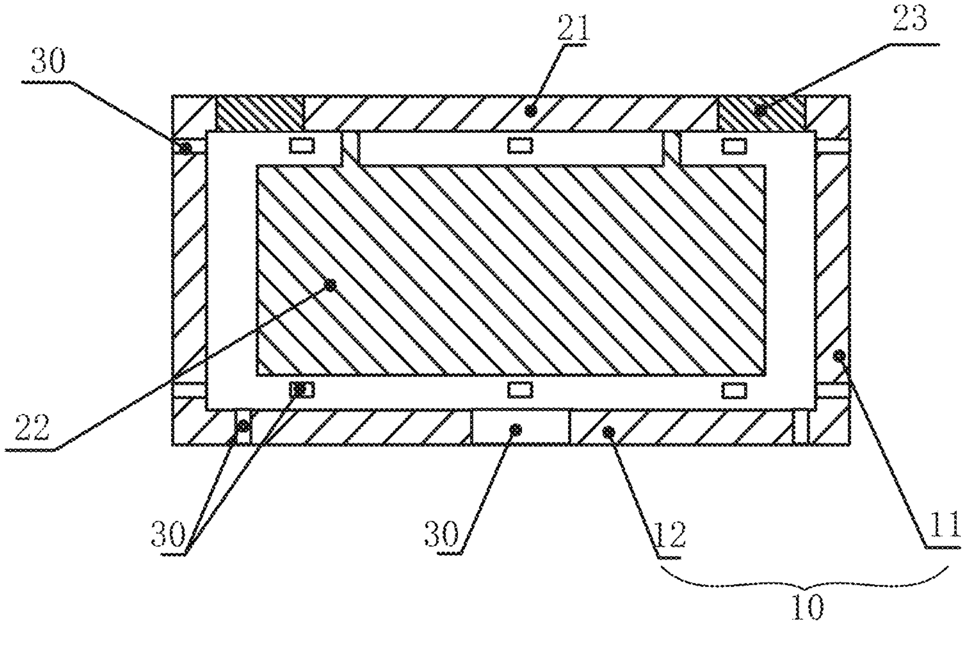

FIGS. 11A and 11B are schematic structures illustrating a bone conduction speaker according to some embodiments of the present disclosure. The bone conduction speaker may include an open housing 10, a panel 21 and a transducer 22. One or more perforative sound guiding holes 30 may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
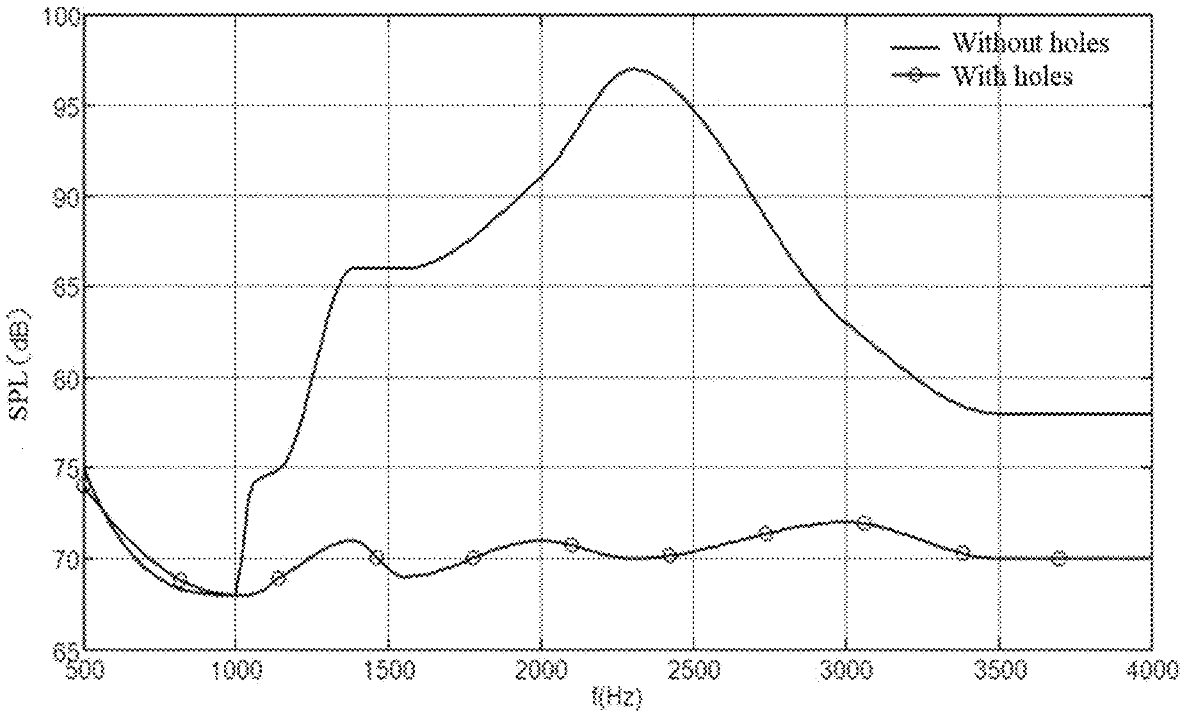
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1700 Hz and 2500 Hz~4000 Hz, this scheme has a better effect of reduced sound leakage than embodiment six.

Embodiment Eight

Figure 12A:
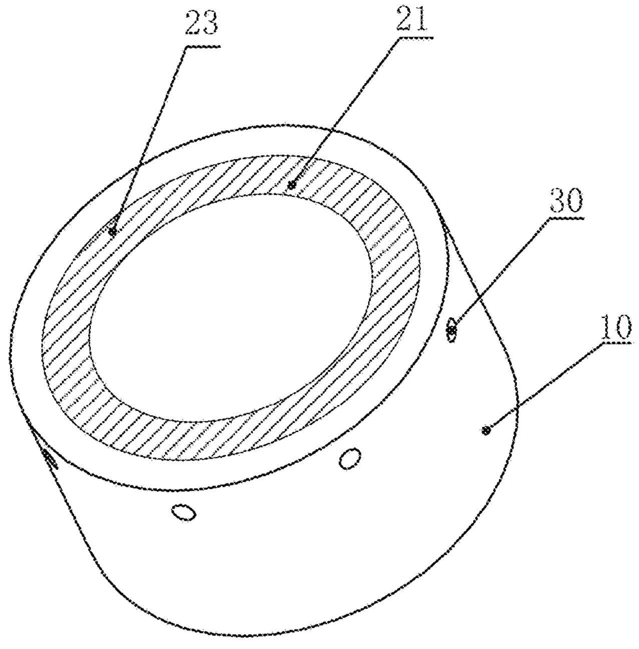
FIGS. 12A and 12B are schematic structures of an exemplary bone conduction speaker according to some embodiments of the present disclosure.
Figure 12B:
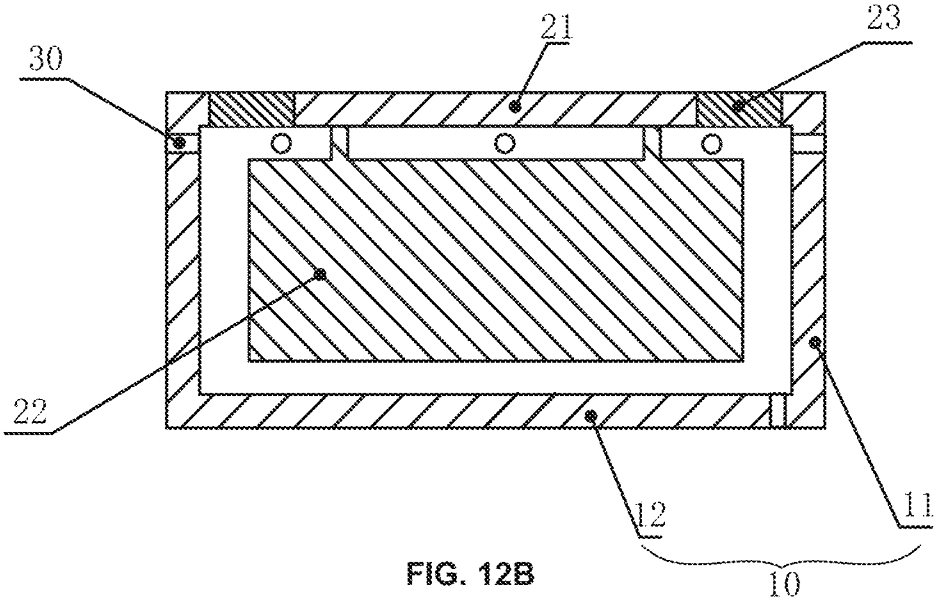

FIGS. 12A and 12B are schematic structures illustrating a bone conduction speaker according to some embodiments of the present disclosure. The bone conduction speaker may include an open housing 10, a panel 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
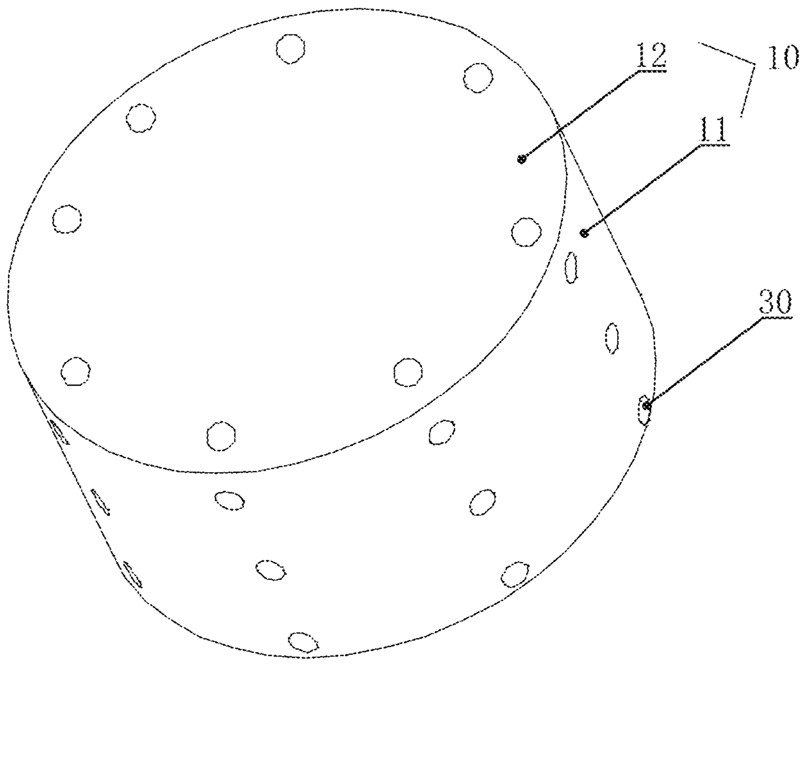
FIGS. 13A and 13B are schematic structures of an exemplary bone conduction speaker according to some embodiments of the present disclosure.
Figure 13B:
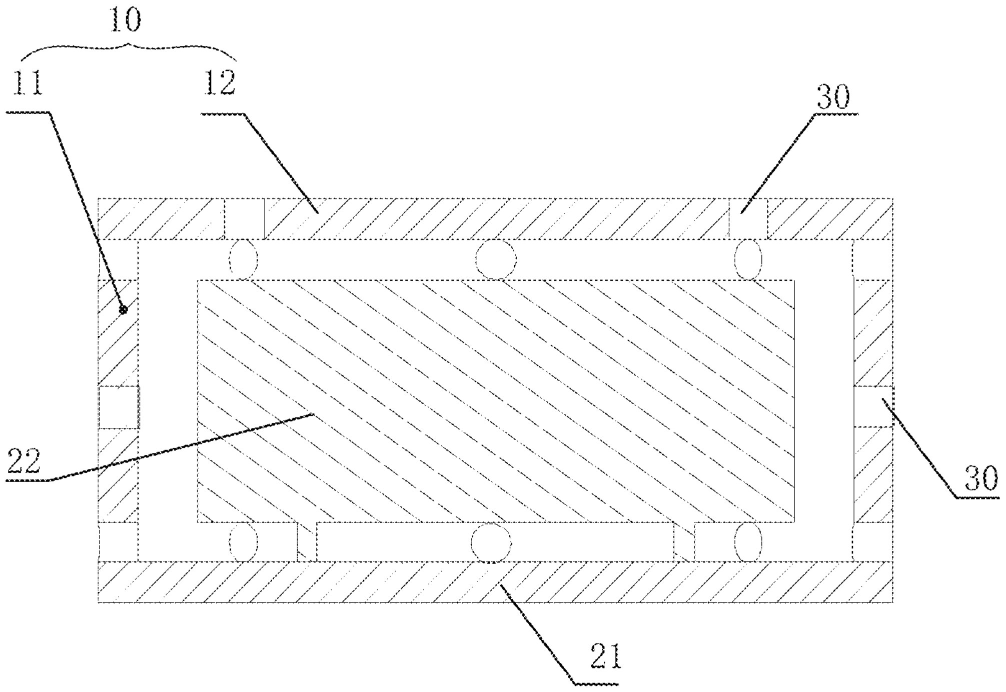

FIGS. 13A and 13B are schematic structures illustrating a bone conduction speaker according to some embodiments of the present disclosure. The bone conduction speaker may include an open housing 10, a panel 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

Figure 14:
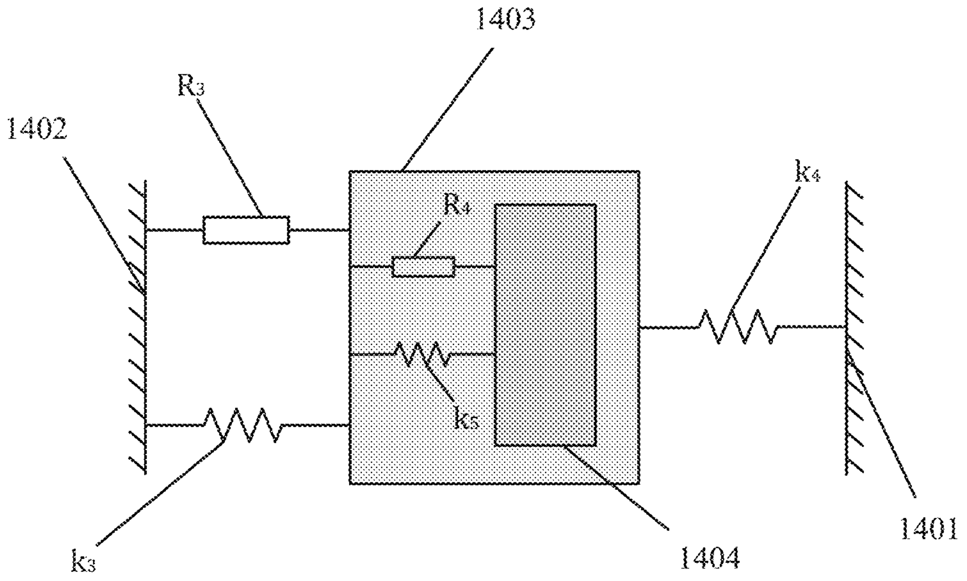
FIG. 14 illustrates an equivalent model of a vibration generation and transferring system of a bone conduction speaker according to some embodiments of the present disclosure.

In general, a sound quality of a bone conduction speaker may be affected by various factors, such as, a physical property of components of the bone conduction speaker, a vibration transfer relationship between the components, a vibration transfer relationship between the bone conduction speaker and external environment, a vibration transfer efficiency of the vibration transfer system, or the like. The components of the bone conduction speaker may include a vibration generation element (such as the transducer 22), a component for fixing the speaker (such as headset bracket/headset lanyard), a vibration transfer component (such as the panel 21 and a vibration transfer layer covering an outer side of the panel 21). The vibration transfer relationships between the components and between the bone conduction speaker and external environment may be determined by the manner that the bone conduction speaker is in contact with a user (such as clamping force, contacting area, contacting shape). FIG. 14 is an equivalent diagram illustrating the vibration generation and vibration transfer system of the bone conduction speaker. The equivalent system of a bone conduction speaker may include a fixed end 1401, a sensor terminal 1402, a vibration unit 1403, and a transducer 1404. The fixed end 1401 may be connected to the vibration unit 1403 through a transfer relationship K1 (i.e., $k_4$ in FIG. 14); the sensor terminal 1402 may be connected to the vibration unit 1403 through the transfer relationship K2 (i.e., $R_3$ and $k_3$ in FIG. 14); the vibration unit 1403 may be connected to the transducer 1404 through the transfer relationship K3 ($R_4$, $k_5$ in FIG. 14).

The vibration unit 1403 may include a panel (e.g., the panel 21) and a transducer (e.g., the transducer 22). The transfer relationships K1, K2 and K3 may be used to describe the relationships between the corresponding components in the equivalent system of the bone conduction speaker (described in detail below). Vibration equations of the equivalent system may be expressed as:

$$m_3x_3''+R_3x_3-R_4x_4'+(k_3+k_4)x_3+k_5(x_3-x_4)=f_3, \quad (14),$$

$$m_4x_4''+R_4x_4''-k_5(x_3-x_4)f_4, \quad (15),$$

where, $m_3$ is an equivalent mass of the vibration unit 1403; $m_4$ is an equivalent mass of the transducer 1404; $x_3$ is an equivalent displacement of the vibration unit 1403; $x_4$ is an equivalent displacement of the transducer 1404; $k_3$ is an equivalent elastic coefficient formed between the sensor terminal 1402 and the vibration unit 1403; $k_4$ is an equivalent elastic coefficient formed between the fixed ends 1401 and the vibration unit 1403; $k_5$ is an equivalent elastic coefficient formed between the transducer 1404 and the vibration unit 1403; $R_3$ is an equivalent damping formed between the sensor terminal 1402 and the vibration unit 1403; $R_4$ is an equivalent damping formed between the transducer 1404 and the vibration unit 1403; $f_3$ and $f_4$ are interaction forces between the vibration unit 1403 and the transducer 1404. The equivalent amplitude of the vibration unit $A_3$ is:

$$A_3 = -\frac{m_4\omega^2}{\begin{array}{c}(m_3\omega^2 + j\omega R_3 - (k_3 + k_4 + k_5))\\(m_4\omega^2 + j\omega R_4 - k_5) - k_5(k_5 - j\omega R_4)\end{array}} \cdot f_0, \quad (16),$$

where $f_0$ is a unit driving force, and $\omega$ is a vibration frequency. The factors affecting the frequency response of the bone conduction speaker may include the vibration generation (including but not limited to, the vibration unit, the transducer, the housing, and the connection means between each other, such as $m_3$, $m_4$, $k_5$, $R_4$ in equation (16)), and the vibration transfer (including but not limited to, the way being in contact with skin, the property of headset bracket/headset lanyard, such as $k_3$, $k_4$, $R_3$ in equation (16)). The frequency response and the sound quality of the bone conduction speaker may also be affected by changes of the structure of each component and the parameter of the connection between each component of the bone conduction speaker; for example, changing the size of the clamping force may be equivalent to changing $k_4$, changing the bond with glue may be equivalent to changing $R_4$ and $k_5$, and changing hardness, elasticity, damping of relevant materials may be equivalent to changing $k_3$ and $R_3$.

In an embodiment, the location of the fixed end 1401 may refer to a point or an area relatively fixed at a location in the vibration process, and the point or area may be deemed as the fixed end. The fixed end may be consisted of certain components, or may also be determined by the structure of the bone conduction speaker. For example, the bone conduction speaker may be suspended, adhered, or absorbed around a user's ear, or may attach to a man's skin through special design for the structure or the appearance of the bone conduction speaker.

The sensor terminal 1402 may be an auditory system of a person for receiving a sound signal. The vibration unit 1403 may be used to protect, support, and connect the transducer. The vibration unit 1403 may include a vibration transfer layer for transmitting vibrations to a user, a panel being in contact with a user directly or indirectly, and a housing for protecting and supporting other vibration generation components. The transducer 1404 may generate sound vibrations.

The transfer relationship K1 may connect the fixed end 1401 and the vibration unit 1403, which refers to the vibration transfer relationship between the fixed end and the vibration generation portion. K1 may be determined based on the shape and the structure of the bone conduction speaker. For example, the bone conduction speaker may be fixed on a user's head by a U-shaped headset bracket/the headset lanyard. The bone conduction speaker may also be set on a helmet, a fire mask or a specific mask, a glass, or the like. Different structures and shapes of the bone conduction speaker may affect the transfer relationship K1. Further, the structure of the bone conduction speaker may include the material, mass, etc., of different parts of the bone conduction speaker. The transfer relationship K2 may connect the sensor terminal 1402 and the vibration unit 1403.

K2 may depend on the component of the transfer system. The transfer may include but not limited to transferring sound through a user's tissue to the user's auditory system. For example, when the sound is transferred to the auditory system through the skin, subcutaneous tissue, bones, etc., the physical properties of various parts and mutual connection relationships between the various parts may have impacts on K2. Further, the vibration unit 1403 may be in contact with tissue. In various embodiments, the contact surface may be the vibration transfer layer or the side surface of the panel. The shape and the size of the contact surface, and the force between the vibration unit 1403 and tissue may influence the transfer coefficient K2.

The transfer coefficient K3 between the vibration unit 1403 and the transducer 1404 may be dependent on the connection property inside the vibration generation unit of the bone conduction speaker. The transducer and the vibration unit may be connected rigidly or flexibly, or changing the relative position of the connector between the vibration unit, and the transducer may affect the transducer for transferring vibrations to the vibration unit, especially the transfer efficiency of the panel, thereby affecting the transfer relationship K3.

When the bone conduction speaker is used, the sound generation and transferring process may affect the sound quality that a user feels. For example, the fixed end, the sense terminal, the vibration unit, the transducer and transfer relationship K1, K2 and K3, etc., mentioned above, may have impacts on the sound quality. It should be noted that K1, K2, and K3 are merely descriptions for the connection manners involved in different parts of the apparatus or the system may include but not limited to physical connection manner, force conduction manner, sound transfer efficiency, etc.

The descriptions of the equivalent system of bone conduction speaker are merely a specific embodiment, and it should not be considered as the only feasible embodiment. Apparently, those skilled in the art, after understanding the basic principles of bone conduction speaker, may make various modifications and changes on the type and detail of the vibrations of the bone conduction speaker, but these changes and modifications are still in the scope described above. For example, K1, K2, and K3 described above may refer to a simple vibration or mechanical transfer mode, or they may also include a complex non-linear transfer system. The transfer relationship may be formed by a direct connection between each portion or may be transferred via a non-contact manner.

The transfer relationship K2 between the sensor terminal 1402 and the vibration unit 1403 may also affect the frequency response of the bone conduction system. The volume of a sound heard by a user's ear depends on the energy received by a user's cochlea. The energy may be affected by various parameters during its transmission, which may be expressed by the following equation:

$$P=\iint_S \alpha \cdot f(a,R) \cdot L \cdot ds, \quad (17),$$

where P is linear to the energy received by the cochlea, S is the area of a contact surface between the bone conduction speaker and a user's face, $\alpha$ is a coefficient for dimension change, f(a, R) denotes an effect of an acceleration a of a point on the contact surface and tightness R of contact between contact surface and a user's skin on energy transmission, L refers to the damping of any contacting points on the transmission of mechanical wave, i.e., a transmission impedance of a unit area.

In terms of (17), the transmission impedance L may have an impact on the sound transmission, and the vibration transmission efficiency of the bone conduction system may relate to the transmission impedance L. The frequency response curve of the bone conduction system may be a superposition of frequency response curves of multiple points on the contact surface. Factors that change the impedance may include the size of the energy transmission area, the shape of the energy transmission area, the roughness of the energy transmission area, the force on the energy transmission area, or a distribution of the force on the energy transmission area, etc. For example, the transmission effect of sound may change when changing the structure and shape of the vibration unit 1403, thus changing the sound quality of the bone conduction speaker. Merely by way of example, the transmission effect of sound may be changed by changing the corresponding physical characteristic of the contact surface of the vibration unit 1403.

Figure 15A:
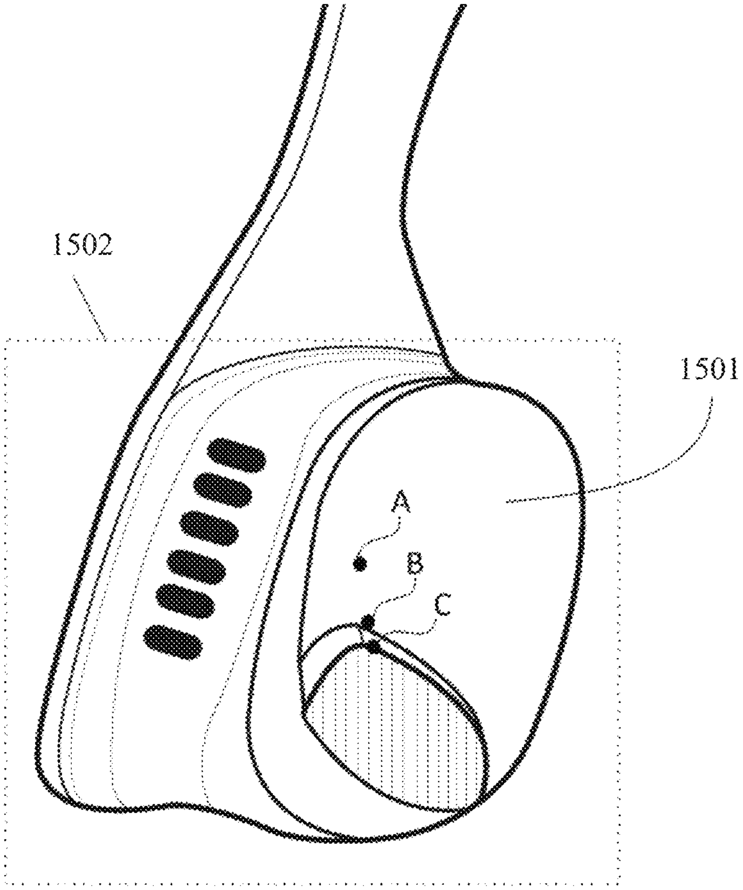
FIG. 15A illustrates a structure of a contact surface of a vibration unit of a bone conduction speaker according to some embodiments of the present disclosure.

A well-designed contact surface may have a gradient structure, and the gradient structure may refer to an area with various heights on the contact surface. The gradient structure may be a convex/concave portion or a sidestep that exists on an outer side (towards a user) or inner side (backward a user) of the contact surface. An embodiment of a vibration unit of the bone conduction speaker may be illustrated in FIG. 15A. A convex/concave portion (not shown in FIG. 15A) may exist on a contact surface 1501 (an outer side of the contact surface). During the operation of the bone conduction speaker, the convex/concave portion may be in contact with a user's face, changing the forces between different positions on the contact surface 1501 and a user's face. A convex portion may be in contact with a user's face in a tighter manner; thus the force on the skin and tissue of a user that contact with the convex portion may be larger, and the force on the skin and tissue that contact with a concave portion may be smaller accordingly. For example, three points A, B, and C on the contact surface 1501 in FIG. 15A may be located on a non-convex portion, an edge of a convex portion, and a convex portion, respectively. When being in contact with a user's skin, clapping forces $F_A$, $F_B$, and $F_C$ on the three points may be $F_C>F_A>F_B$. In some embodiments, a clamping force on the point B may be 0; i.e., the point B may not be in contact with the skin of a user. The skin and tissue of a user's face may have different impedances and responses under different forces. The part of a user's face under a larger force may correspond to a smaller impedance rate and have a high-pass filtering characteristic for an acoustic wave. The part under a smaller force may correspond to a larger impedance rate, and have a low-pass filtering characteristic for an acoustic wave. Different parts of the contact surface 1501 may correspond to different impedance characteristics L. Different parts may correspond to different frequency responses for sound transmission. The transmission effect of the sound via the entire contact surface may be equivalent to a sum of transmission effect of the sound via each part of the contact surface. A smooth curve may be formed when the sound transmits into a user's brain, which may avoid exorbitant harmonic peak under a low frequency or a high frequency, thus obtaining an ideal frequency response across the whole bandwidth. Similarly, the material and thickness of the contact surface 1501 may have an effect on the transmission effect of the sound, thus affecting the sound quality. For example, when the contact surface is soft, the transmission effect of the sound in the low frequency range may be better than that in the high frequency range, and when the contact surface is hard, the transmission effect of the sound in the high frequency range may be better than that in the low frequency range.

Figure 15B:
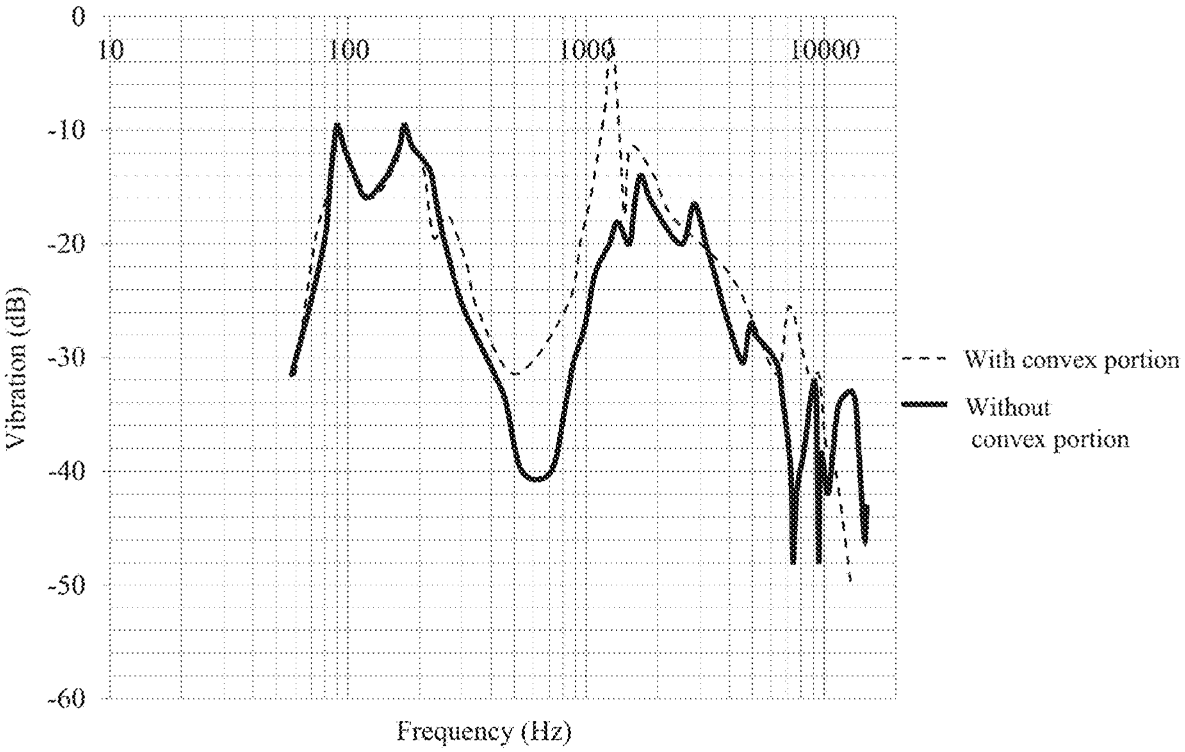
FIG. 15B illustrates a vibration response curve of a bone conduction speaker according to some embodiments of the present disclosure.

FIG. 15B shows response curves of the bone conduction speaker with different contact areas. The dotted line corresponds to the frequency response of the bone conduction speaker having a convex portion on the contact surface. The solid line corresponds to the frequency response of the bone conduction speaker having a non-convex portion of the contact surface. In a low-intermediate frequency range, the vibration of the non-convex portion may be weakened relative to that of the convex portion, which may form one "pit" on the frequency response curve, indicating that the frequency response is not ideal and may influence the sound quality.

The above descriptions of the FIG. 15B are merely the explanation for a specific embodiment, and those skilled in the art, after understanding the basic principles of bone conduction speaker, may make various modifications and changes on the structure and the components to achieve different frequency response effects.

It should be noted that for those skilled in the art, the shape and the structure of the contact surface may not be limited to the descriptions above. In some embodiments, the convex portion or the concave portion may be located at an edge of the contact surface or may be located at the center of the contact surface. The contact surface may include one or more convex portions or concave portions. The convex portion and/or concave portion may be located on the contact surface. The material of the convex portion or the concave portion may be different from the material of the contact surface, such as flexible material, rigid material, or a material easy to produce a specific force gradient. The material may be memory material or non-memory material; the material may be a single material or composite material. The structure pattern of the convex portion or concave portion of the contact surface may include but not limited to axial symmetrical pattern, central symmetrical pattern, symmetrical rotational pattern, asymmetrical pattern, etc. The structure pattern of the convex portion or the concave portion on the contact surface may include one pattern, two patterns, or a combination of two or patterns. The contact surface may include but not limited to a certain degree of smoothness, roughness, waviness, or the like. The distribution of the convex portions or the concave portions on the contact surface may include but not limited to axial symmetry, the center of symmetry, rotational symmetry, asymmetry, etc. The convex portion or the concave portion may be set at an edge of the contact surface or may be distributed inside the contact surface.

It should be noted that, the gradient structure on the contact surface in a bone conduction speaker disclosed in the present disclosure is also applicable for an air conduction speaker. For example, the air conduction speaker may include a gradient structure that exists on an outer side (towards a user) or inner side (backward a user) of a contact surface between the air conduction speaker and the user's face. In some embodiments, the gradient structure on the outer side of the contact surface may match the shape of the user's auricle (e.g., the shape of fossa triangularis, the shape of anthelix, etc.) such that the user such can wear the air conduction speaker more comfortably. Optionally or additionally, the air conduction speaker or the bone conduction speaker may include one or more sound guiding holes. The one or more sound guiding holes may be configured to guide sound waves inside a housing of the air conduction speaker or the bone conduction speaker through the one or more sound guiding holes to an outside of the housing. The one or more sound guiding holes may be located on a same wall or different walls of the housing. Merely by way of example, the one or more sound guiding holes may include two sound guiding holes. One sound guiding hole may be located on the contact surface of the air conduction speaker. The other sound guiding hole may be located on a wall (e.g., a sidewall) of the housing different from the contact surface.

Figure 16:
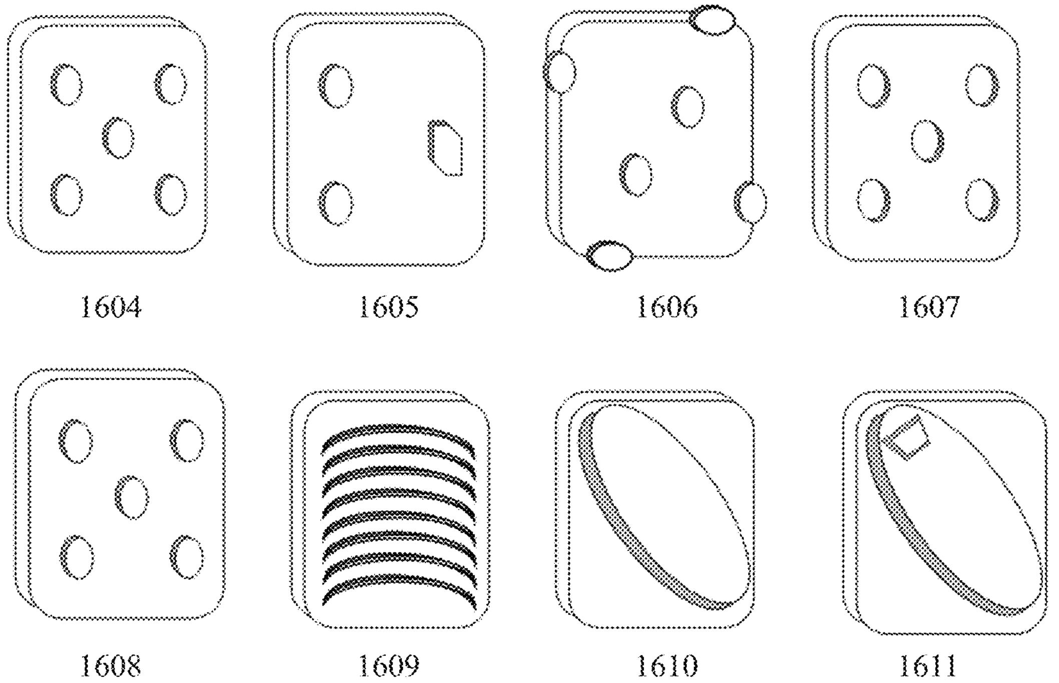
FIG. 16 illustrates a structure of a contact surface of a vibration unit of a bone conduction speaker according to some embodiments of the present disclosure

1604-1611 in FIG. 16 are embodiments of the structure of the contact surface.

1604 in FIG. 16 shows multiple convex portions with similar shapes and structures on the contact surface. The convex portions may be made of a same material or similar materials as other parts of the panel, or different materials. In particular, the convex portions may be made of a memory material and the material of the vibration transfer layer, wherein the proportion of the memory material may be not less than 10%. Preferably, the proportion may be not less than 50%. The area of a single convex portion may be 1%-80% of the total area, preferably 5%-70%, and more preferably 8%-40%. The sum of the area of the convex portions may be 5%-80% of the total area, preferably 10%-60%. There may be at least one convex portion, preferably one convex portion, more preferably two convex portions, and further preferably at least five convex portions. The shapes of the convex portions may be circular, oval, triangular, rectangular, trapezoidal, irregular polygons or other similar patterns, wherein the structures of the convex portions may be symmetrical, or asymmetrical, the distribution of the convex portions may be symmetrically distributed or asymmetrically distributed, the number of the convex portions may be one or more, the heights of the convex portions may be the same or different, and the height distribution of the convex portions may form a certain gradient.

1605 in FIG. 16 shows an embodiment of convex portions on the contact surface with two or more structure patterns. There may be one or more convex portions of different patterns. Shapes of the two or more convex portions may be circular, oval, triangular, rectangular, trapezoidal, irregular polygons, other shapes, or a combination of any two or more shapes. The material, quantity, size, symmetry of the convex portions may be similar to that as illustrated in 1604.

1606 in FIG. 16 shows an embodiment that the convex portions may be distributed at edges of the contact surface or in the contact surface. The number of the convex portions located at edges of the contact surface may be 1% to 80% of the total number of the convex portions, preferably 5%-70%, more preferably 10%-50%, and more preferably 30%-40%. The material, quantity, size, shape, or symmetry of the convex portions may be similar to 1604.

1607 in FIG. 16 shows a structure pattern of concave portions on the contact surface. The structures of the concave portions may be symmetrical or asymmetrical, the distribution of the concave portions may be symmetrical or asymmetrical, the number of the concave portions may be one or more than one, the shapes of the concave portions may be same or different, and the concave portions may be hollow. The area of a single concave portion may be not less than 1%-80% of the total area of the contact surface, preferably 5%-70%, and more preferably 8%-40%. The sum of the area of all concave portions may be 5%-80% of the total area, preferably 10%-60%. There may be at least one concave, preferably one, more preferably two, and more preferably at least five. The shapes of the concave portions may be circular, oval, triangular, rectangular, trapezoidal, irregular polygons or other similar patterns.

1608 in FIG. 16 shows a contact surface including convex portions and concave portions. There may be one or more convex portions and one or more concave portions. The ratio of the number of the concave portions to the convex portions may be 0.1%-100%, preferably 1%-80%, more preferably 5%-60%, further preferably 10%-20%. The material, quantity, size, shape, or symmetry of each convex portion or each concave portion may be similar to 1604.

1609 in FIG. 16 shows an embodiment of the contact surface having a certain waviness. The waviness may be formed by two or more convex/concave portions. Preferably, the distances between adjacent convex/concave portions may be equal. More preferably, the distances between convex/concave portions may be presented in an arithmetic progression.

1610 in FIG. 16 shows an embodiment of a convex portion having a large area on the contact surface. The area of the convex portion may be 30%-80% of the total area of the contact surface. Preferably, a part of an edge of the convex portion may substantially contact with a part of an edge of the contact surface.

1611 in FIG. 16 shows a first convex portion having a large area on the contact surface, and a second convex portion on the first convex portion may have a smaller area. The area of the convex portion having a larger area may be 30%-80% of the total area, and the area of the convex portion having a smaller area may be 1%-30% of the total area, preferably 5%-20%. The area of the smaller area may be 5%-80% that of the larger area, preferably 10%-30%.

The above descriptions of the contact surface structure of the bone conduction speaker are merely a specific embodiment, and it may not be considered the only feasible implementation. Apparently, those skilled in the art, after understanding the basic principles of bone conduction speaker, may make various modifications and changes in the type and detail of the contact surface of the bone conduction speaker, but these changes and modifications are still within the scope described above. For example, the count of the convex portions and the concave portions may not be limited to that of the FIG. 16, and modifications made on the convex portions, the concave portions, or the patterns of the contact surface may remain in the descriptions above. Moreover, the contact surface of at least one vibration unit of the bone conduction speaker may have the same or different shapes and materials. The effect of vibrations transferred via different contact surfaces may have differences due to the properties of the contact surfaces, which may result in different sound effects.

In practical applications, the acoustic output device as described elsewhere may include different application forms such as bracelets, glasses, helmets, watches, clothing, or backpacks, smart headsets, earphones, etc. Merely by way of example, an earphone including the air conduction speaker and an ear hook may be provided as an example.

Figure 17:
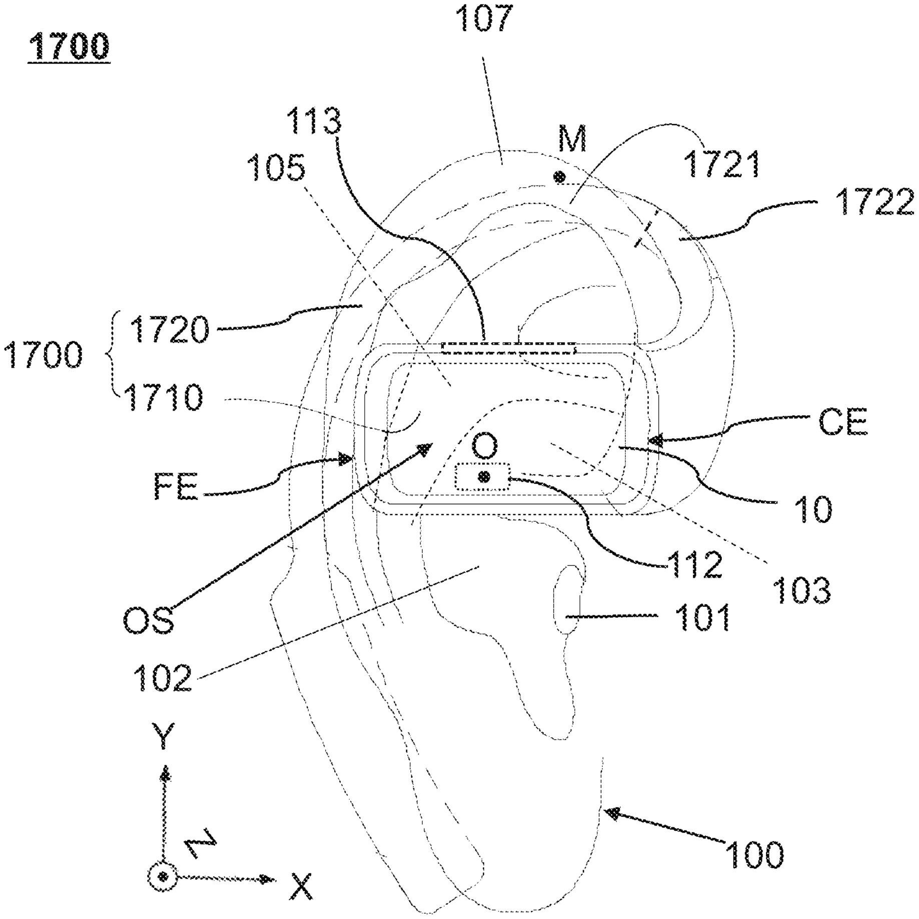
FIG. 17 is a schematic diagram illustrating an exemplary wearing state of an earphone according to some embodiments of the present disclosure.
Figure 18:
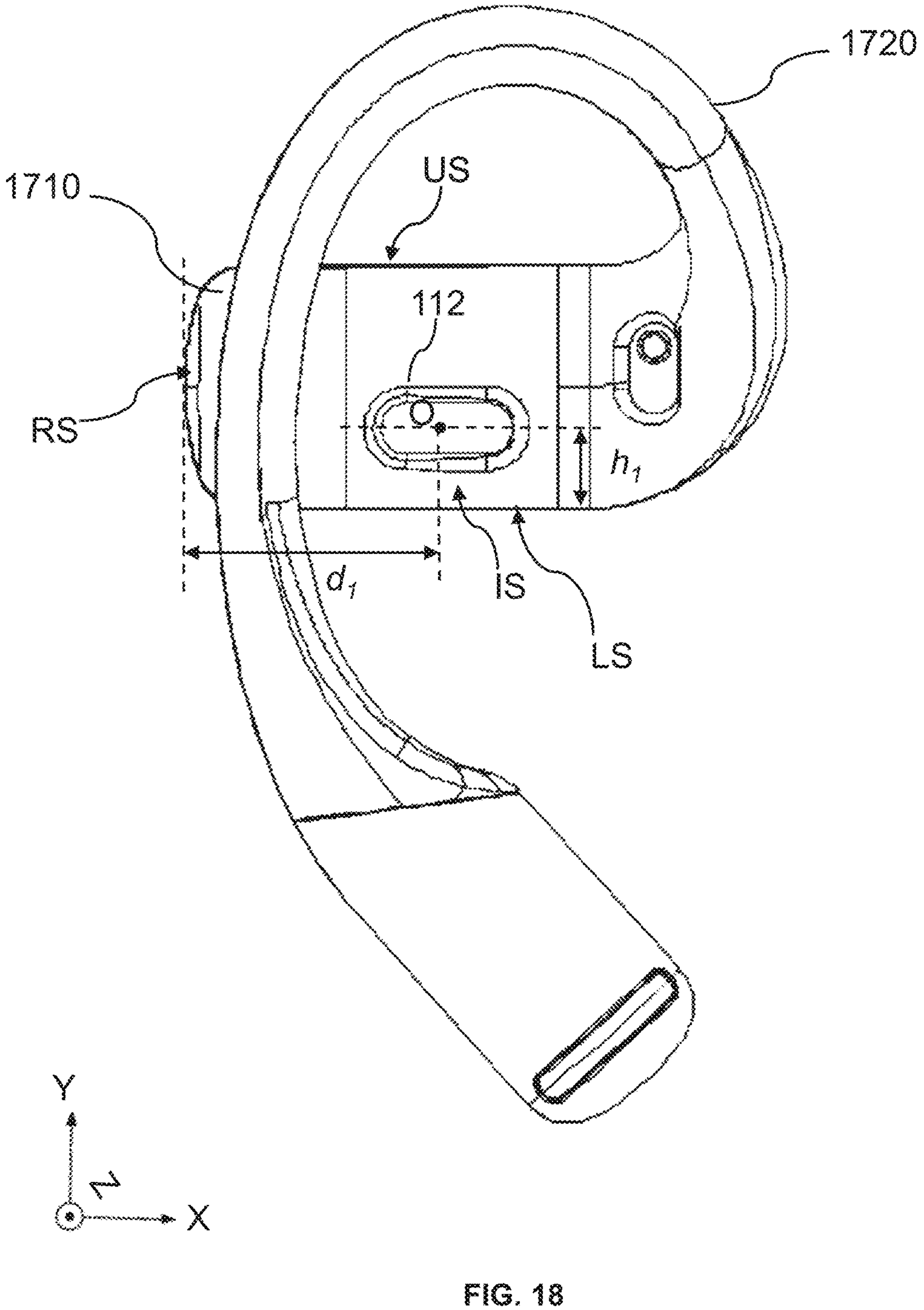
FIG. 18 is a schematic diagram illustrating a structure of a side of the earphone shown in FIG. 17 facing the ear.

FIG. 17 is a schematic diagram illustrating an exemplary wearing state of an earphone according to some embodiments of the present disclosure. FIG. 18 is a schematic diagram illustrating a structure of a side of the earphone shown in FIG. 17 facing the ear.

As shown in FIG. 17, an earphone 1700 may include a speaker (also be referred to as a sound production component) 1710 and an ear hook 1720.

One end of the ear hook 1720 may be connected to the sound production component 1710 and the other end of the ear hook 1720 extends along a junction between the user's ear and head. In some embodiments, the ear hook 1720 may be an arc-shaped structure that is adapted to the user's auricle, so that the ear hook 1720 can be hung on the user's auricle. For example, the ear hook 1720 may have an arc-shaped structure adapted to the junction of the user's head and ear, so that the ear hook 1720 can be hung between the user's ear and head. In some embodiments, the ear hook 1720 may also be a clamping structure adapted to the user's auricle, so that the ear hook 1720 can be clamped at the user's auricle. Exemplarily, the ear hook 1720 may include a hook portion 1721 (i.e., a first portion) and a connection portion 1722 (i.e., a second portion) that are connected in sequence. The connection portion 1722 connects the hook portion 1721 to the sound production component 1710 so that the earphone 1700 is curved in the three-dimensional space when it is in a non-wearing state (i.e., in a natural state). In other words, in the three-dimensional space, the hook portion, the connection portion, and the sound production component 1710 are not co-planar. In such cases, when the earphone 1700 is in the wearing state, the hook portion may be primarily for hanging between a rear side of the user's ear and the head, and the sound production component 1710 may be primarily for contacting a front side of the user's ear, thereby allowing the sound production component 1710 and the hook portion 1721 to cooperate to clamp the ear. Exemplarily, the connection portion may extend from the head toward an outside of the head and cooperate with the hook portion 1721 to provide a compression force on the front side of the ear for the sound production component 1710. The sound production component 1710 may specifically be pressed against an area where a part such as the ear's cavum concha 102, the concha boat 103, the triangular fossa, the antihelix 105, etc., is located under the compression force so that the external ear canal 101 of the ear 100 is not obscured when the earphone 1700 is in the wearing state. In the present disclosure, when the earphone 1700 is worn by a user, at least part of the earphone 1700 is located at the antihelix 105 may be provided as an example.

It should be noted that different users may have individual differences, resulting in different shapes, dimensions, etc., of ears. For ease of description and understanding, if not otherwise specified, the present disclosure primarily uses a "standard" shape and dimension ear model as a reference and further describes the wearing manners of an acoustic device (e.g., the earphone 1700 in FIG. 17) in different embodiments on the ear model. For example, a simulator (e.g., GRAS 45BC KEMAR) containing a head and (left and right) ears produced based on standards of ANSI: S3.36, S3.25 and IEC: 60318-7, may be used as a reference for wearing the acoustic device to present a scenario in which most users wear the acoustic device normally. Merely by way of example, the reference ear may have the following relevant features: a projection of an auricle on a sagittal plane in a vertical axis direction may be in a range of 49.5 mm-74.3 mm, and a projection of the auricle on the sagittal plane in a sagittal axis direction may be in a range of 36.6 mm-55 mm. Thus, in the present disclosure, the descriptions such as "worn by the user," "in the wearing state," and "in the wearing state" may refer to the acoustic device described in the present disclosure being worn on the ear of the aforementioned simulator. Of course, considering the individual differences of different users, structures, shapes, dimensions, thicknesses, etc., of one or more parts of the ear may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) may have different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the "front side of the ear" as described in the present disclosure is a concept relative to the "rear side of the ear," where the former refers to a side of the ear away from the head and the latter refers to a side of the ear facing the head. In this case, when the acoustic device is in the wearing state, observing the ear of the above simulator in a direction along the coronal axis of the human body, a schematic diagram illustrating the front side of the ear as shown in FIG. 17 is obtained.

In some embodiments, the housing 10 may be provided with a sound outlet 112 on a side of the housing 10 toward the ear, and the sound outlet 112 is used to transmit air inside the housing 10 out of the housing 10 and into the ear canal so that the user can hear the sound transmitted by the sound outlet 112. In some embodiments, the sound production component 1710 may include a diaphragm. The diaphragm may divide the housing 10 to form a front cavity and a rear cavity of the earphone 1700, and the sound outlet 112 may communicate with the front cavity and transmit the sound generated by the front cavity out of the housing 10 and into the ear canal. In some embodiments, a portion of the sound exported through the sound outlet 112 may be transmitted to the ear canal thereby allowing the user to hear the sound, and another portion thereof may be transmitted through a gap between the sound production component 1710 and the ear (e.g., a portion of the antihelix 105 not covered by the sound production component 1710) to the outside environment, thereby creating a leaked sound wave in the far-field. At the same time, the sound guiding hole(s) 30 may include one or more pressure relief holes (e.g., the pressure relief hole 113 shown in FIG. 17) provided on one or more other sides of the housing 10 (e.g., a side away from or back from the user's ear canal, a side adjacent to the side where the sound outlet 112 locates). The pressure relief hole 113 is further away from the ear canal than the sound outlet 112, and the sound transmitted by the pressure relief holes 113 forms a guided sound wave in the far-field. The sound outlet 112 and the pressure relief hole 113 may be regarded as the aforementioned two-point sound sources. An intensity of the aforementioned leaked sound wave is similar to an intensity of the aforementioned guided sound wave, and a phase of the aforementioned leaked sound wave and a phase of the aforementioned guided sound wave are opposite (or substantially opposite) to each other so that the aforementioned leaked sound wave and the aforementioned guided sound wave can cancel each other out in the far-field, which is conducive to reducing the leakage of the earphone 1700 in the far-field.

In some embodiments, the ear hook 1720 may include, but is not limited to, an ear hook, an elastic band, etc., allowing the earphone 1700 to be better fixed to the user and prevent the user from dropping it during use. In some embodiments, the earphone 1700 may not include the ear hook 1720, and the sound production component 1710 may be placed in the vicinity of the user's ear using a hanging or clamping manner.

In some embodiments, the sound production component 1710 may be, for example, circular, elliptical, runway-shaped, polygonal, U-shaped, V-shaped, semi-circular, or other regular or irregular shapes so that the sound production component 1710 may be hung directly at the user's ear 100. In some embodiments, the sound production component 1710 may have a long-axis direction X and a short-axis direction Y that are perpendicular to the thickness direction Z and orthogonal to each other. The short-axis direction Y may be defined as a direction having the shortest extension dimension in a shape of a two-dimensional projection plane (e.g., a projection of the sound production component 1710 in a plane on which its outer side surface is located, or a projection on a sagittal plane) of the sound production component 1710. For example, when the projection shape is rectangular or approximately rectangular, the short-axis direction is a width direction of the rectangle or approximately rectangle. The long-axis direction X may be defined as a direction perpendicular to the short-axis direction Y in the shape of the projection of the sound production component 1710 on the sagittal plane. For example, when the projection shape is rectangular or approximately rectangular, the long-axis direction is a length direction of the rectangle or approximately rectangle. The thickness direction Z may be defined as a direction perpendicular to the two-dimensional projection plane, for example, in the same direction as a coronal axis, both pointing to the left-and-right side of the body.

As shown in FIG. 17, the ear hook 1720 is an arc-shaped structure that fits at the junction of the user's head and the ear 100. The sound production component 1710 (or the housing 10 of the sound production component 1710) may have a connection end CE connected to the ear hook 1720 and a free end FE not connected to the ear hook 1720. When the earphone 1700 is in the wearing state, a first portion 1721 of the ear hook 1720 (e.g., the hook portion of the ear hook 1720) is positioned between the user's ear (e.g., the helix 107) and the head, and a second portion 1722 of the ear hook 1720 (e.g., the connection portion of the ear hook) extends toward a side of the auricle away from the head and connects to the connection end CE of the sound production component 1710 to hold the sound production component 1710 in a position near the ear canal but without blocking the ear canal.

Referring to FIGS. 17 and 18, the sound production component 1710 may have an inner side surface IS (also called an inner side surface of the housing of the housing 10) facing the ear along the thickness direction Z in the wearing state, an outer side surface OS (also called an outer side surface of the housing 10) away from the ear 100, and a connection surface connecting the inner side surface IS and the outer side surface OS. It should be noted that in the wearing state, when viewed along a direction in which the coronal axis (i.e., the thickness direction Z), the sound production component 1710 may be provided in a shape of a circle, an oval, a rounded square, a rounded rectangle, etc. When the sound production component 1710 is provided in the shape of a circle, an ellipse, etc., the above-mentioned connection surface may refer to an arc-shaped side surface of the sound production component 1710; and when the sound production component 1710 is set in the shape of a rounded square, a rounded rectangle, etc., the above-mentioned connection surface may include a lower side surface LS (also referred to as a lower side surface of the housing 10), an upper side surface US (also referred to as an upper side surface of the housing 10), and a rear side surface RS (also referred to as a rear side surface of the housing 10) as mentioned later. The upper side surface US and the lower side surface LS may refer to a side of the sound production component 1710 in the wearing state along the short-axis direction Y away from the external ear canal 101 and a side of the sound production component 1710 in the wearing state along the short-axis direction Y facing to the external ear canal 101, respectively; and the rear side surface RS may refer to a side of the sound production component 1710 in the wearing state along the length direction Y toward the back of the head. For the sake of description, this embodiment is exemplarily illustrated with the sound production component 1710 set in a rounded rectangle. The length of the sound production component 1710 in the long-axis direction X may be greater than the width of the sound production component 1710 in the short-axis direction Y. In some embodiments, the rear side surface RS of the earphone may be curved in order to improve the aesthetics and wearing comfort of the earphone.

In some embodiments, as shown in FIG. 17, when the earphone 1700 is in the wearing state, the long-axis direction X of the sound production component 1710 may be set horizontally or approximately horizontally. In such cases, the sound production component 1710 is located at least partially at the antihelix 105, and the free end FE of the sound production component 1710 may be oriented toward the back of the head. With the sound production component 1710 in a horizontal or approximately horizontal state, the projection of the long-axis direction X of the sound production component 1710 on the sagittal plane may be in the same direction as the sagittal axis, the projection of the short-axis direction Y on the sagittal plane may be in the same direction as the vertical axis, and the thickness direction Z is perpendicular to the sagittal plane.

In some embodiments, in order to improve the fit between the earphone 1700 and the ear 100 and improve the stability of the earphone 1700 in the wearing state, the inner side surface IS of the housing 10 may be pressed onto the surface of the ear 100 (e.g., the antihelix 105) to increase the resistance of the earphone 1700 when falling off from the ear 100.

In some embodiments, since the ear hook itself is elastic, a distance between the sound production component and the ear hook may change between the wearing state and the non-wearing state (a distance in the non-wearing state is less than a distance in the wearing state). In addition, due to the physiological structure of the ear 100, in the wearing state, a plane where the sound production component 1710 is located may have a certain distance along the coronal axis direction from a plane where the ear hook 1720 is located, so that the sound production component 1710 can exert a proper pressure on the ear. In some embodiments, in order to improve the wearing comfort of the earphone 1700, and to make the sound production component 1710 cooperate with the ear hook 1720 to press and hold the sound production component 1710 on the ear, in the non-wearing state, a distance from the center O of the sound outlet 112 to the plane where the ear hook 1720 is located is in a range of 3 mm to 6 mm. Since the ear hook 1720 has a non-regular shape, for example, the ear hook 1720 may be a curved structure, the plane where the ear hook 1720 is located (also referred to as an ear hook plane) may be considered to be that: in the non-wearing state, when the ear hook is naturally lying on a plane, the plane is tangent to at least three points on the ear hook and constitutes the ear hook plane. In some embodiments, in the wearing state, the ear hook may be approximated as fitting to the head, in this case, the deflection of the ear hook plane with respect to the sagittal plane may be negligible. In some embodiments, in the non-wearing state, the distance from the center O of the sound outlet 112 to the plane where the ear hook 1720 is located is between 3.5 mm and 5.5 mm. In some embodiments, in the non-wearing state, the distance from the center O of the sound outlet 112 to the plane where the ear hook 1720 is located is between 4.0 mm and 5.0 mm. In some embodiments, in the non-wearing state, the distance from the center O of the sound outlet 112 to the plane where the ear hook 1720 is located is between 4.3 mm and 4.7 mm.

In some embodiments, referring to FIGS. 17 and 18, when the earphone 1700 is pressed onto the ear 100, in order to keep the sound outlet 112 on the inner side surface IS from being obstructed by ear tissues, the projection of the sound outlet 112 on the sagittal plane may partially or fully coincide with the projection of an inner concave structure (e.g., the concha boat 103) of the ear on the sagittal plane. In some embodiments, since the concha boat 103 is communicated with the cavum concha 102 and the ear canal is located in the cavum concha 102, when at least a portion of the projection of the sound outlet 112 on the sagittal plane is located within the concha boat 103, the sound output from the sound outlet 112 may reach the ear canal unobstructed, resulting in a higher volume received by the ear canal. In some embodiments, a long-axis dimension of the sound production component 1710 may not be too long. If the long-axis dimension of the sound production component 1710 is too long, the projection of the free end FE on the sagittal plane may exceed the projection of the ear 100 on the sagittal plane, thereby affecting the fitting effect of the sound production component 1710 to the ear. Therefore, the long-axis dimension of the sound production component 1710 may be designed so that the projection of the free end FE on the sagittal plane does not exceed the projection of the helix 107 on the sagittal plane. In some embodiments, when the projection of the free end FE on the sagittal plane does not exceed the projection of the helix 107 on the sagittal plane, in order to make at least part of the projection of the sound outlet 112 on the sagittal plane located within the concha boat 103, i.e., the sound outlet 112 is at least partially facing the concha boat 103 when actually worn, a distance d1 from a center O of the sound outlet 112 to the rear side surface RS of the sound production component 1710 along the X-direction is in a range of 9.5 mm to 15.0 mm. In some embodiments, the distance d1 from the center O of the sound outlet 112 to the rear side surface RS of the sound production component 1710 along the X-direction is in a range of 10.5 mm to 14.0 mm. In some embodiments, the distance d1 from the center O of the sound outlet 112 to the rear side surface RS of the sound production component 1710 along the X-direction is in a range of 11.0 mm to 13.5 mm. In some embodiments, the distance d1 from the center O of the sound outlet 112 to the rear side surface RS of the sound production component 1710 along the X-direction is in a range of 11.5 mm to 13.0 mm. In some embodiments, the distance d1 from the center O of the sound outlet 112 to the rear side surface RS of the sound production component 1710 along the X-direction is in a range of 12.0 mm to 12.5 mm.

It should be known that since the sound outlet 112 and the pressure relief hole 113 are provided on the housing 10 and each side wall of the housing 10 has a certain thickness, the sound outlet 112 and the pressure relief hole 113 are both holes with a certain depth. At this time, the sound outlet 112 and the pressure relief hole 113 may both have an inner opening and an outer opening. For ease of description, in the present disclosure, the center O of the sound outlet 112 described above and below may refer to the centroid of the outer opening of the sound outlet 112. In some embodiments, the rear side surface RS of the earphone may be curved in order to enhance the aesthetics and wearing comfort of the earphone. When the rear side surface RS is curved, a distance between a position (e.g., the center O of the sound outlet 112) and the rear side surface RS may refer to a distance from that position to a tangent plane of the rear side surface RS that is farthest from the center of the sound production component and parallel to the short-axis of the sound production component.

In the present disclosure, the sound outlet 112 and the pressure relief hole 113 communicating with the front and rear cavities, respectively, may be regarded as a point sound source A1 and a point sound source A2, respectively. The ear canal may be regarded as a listening position. At least part of the housing 10 of the sound production component 1710 and/or at least part of the auricle may be regarded as a baffle to increase a difference between sound paths from the sound outlet 112 and the pressure relief hole 113 to the ear canal so as to increase the sound intensity at the ear canal while maintaining the far-field sound leakage reduction effect. When the earphone 1700 adopts the structure shown in FIG. 17, i.e., when at least a portion of the housing 10 is located at the antihelix 105, in terms of the listening effect, a sound wave of the sound outlet 112 may reach the ear canal directly. In this case, the sound outlet 112 may be provided at a position on the inner side surface IS near the lower side surface LS, and the pressure relief hole 113 may be provided at a position away from the sound outlet 112, for example, the pressure relief hole 113 may be provided at a position on the outer side surface OS or the upper side surface US away from the sound outlet 112. A sound wave of the pressure relief hole 113 needs to bypass the exterior of the sound production component 1710 to interfere with the sound wave of the sound outlet 112 at the ear canal. In addition, an upper convex and lower concave structure on the auricle (e.g., the antihelix 105 in its propagation path) increases the sound path of the sound transmitted from the pressure relief hole 113 to the ear canal. Thus, the sound production component 1710 itself and/or the auricle is equivalent to a baffle between the sound outlet 112 and the pressure relief hole 113. The baffle increases the sound path from the pressure relief hole 113 to the ear canal and reduces the intensity of the sound waves from the pressure relief hole 113 in the ear canal, thereby reducing the cancellation degree between the two sounds emitted from the sound outlet 112 and the pressure relief hole 113 in the ear canal, resulting in an increase in the volume in the ear canal. In terms of the sound leakage effect, since the sound waves generated by both the sound outlet 112 and the pressure relief hole 113 can interfere without bypassing the sound production component 1710 itself in a relatively large spatial area (similar to the case without a baffle), the sound leakage is not increased significantly. Therefore, by setting the sound outlet 112 and pressure relief hole 113 at suitable positions, it is possible to significantly increase the volume in the ear canal without a significant increase in the leakage sound volume.

In some embodiments, referring to FIG. 18, in order to enhance the sound intensity of the sound outlet 112 in the ear canal (i.e., the listening position), the sound outlet 112 may be provided closer to the ear canal, i.e., the sound outlet 112 may be located closer to the lower side surface LS of the sound production component 1710 in the Y-direction. In some embodiments, a distance h1 from the center O of the sound outlet 112 along the Y-direction to the lower side surface LS of the sound production component 1710 is in a range of 2.3 mm to 3.6 mm. In some embodiments, the distance h1 from the center O of the sound outlet 112 along the Y-direction to the lower side surface LS of the sound production component 1710 is in a range of 2.5 mm to 3.4 mm. In some embodiments, the distance h1 from the center O of the sound outlet 112 along the Y-direction to the lower side surface LS of the sound production component 1710 is in a range of 2.7 mm to 3.2 mm. In some embodiments, the distance h1 from the center O of the sound outlet 112 along the Y-direction to the lower side surface LS of the sound production component 1710 is in a range of 2.8 mm to 3.1 mm. In some embodiments, the distance h1 from the center O of the sound outlet 112 along the Y-direction to the lower side surface LS of the sound production component 1710 is in a range of 2.9 mm to 3.0 mm.

In some embodiments, referring to FIG. 17, in order to ensure that the projection of the sound outlet 112 on the sagittal plane when the earphone 1700 is worn can be partially or fully located within the concha boat region, when the user wears the earphone 1700, a distance from the center O of the sound outlet 112 to an upper vertex M of the ear hook 1720 is in a range of 17.5 mm to 27.0 mm, wherein the upper vertex M of the ear hook 1720 refers to a point closest to the head on the ear hook 1720 along the vertical axis. In some embodiments, when the user wears the earphone 1700, the distance from the center O of the sound outlet 112 to the upper vertex M of the ear hook 1720 is in a range of 20.0 mm to 25.5 mm. In some embodiments, when the user wears the earphone 1700, the distance from the center O of the sound outlet 112 to the upper vertex M of the ear hook 1720 is in a range of 21.0 mm to 24.5 mm. In some embodiments, when the user wears the earphone 1700, the distance from the center O of the sound outlet 112 to the upper vertex M of the ear hook 1720 is in a range of 22.0 mm to 23.5 mm. In some embodiments, when the user wears the earphone 1700, the distance from the center O of the sound outlet 112 to the upper vertex M of the ear hook 1720 is in a range of 22.5 mm to 23.0 mm.

In some embodiments, a ratio of the distance between the center O of the sound outlet 112 and the upper vertex M of the ear hook 1720 to a distance between the upper and lower boundaries of the inner side surface IS (i.e., a distance between the upper side surface US and the lower side surface LS of the sound production component 1710 or housing 10) cannot be too large or too small. In some embodiments, when the upper side surface US and/or the lower side surface LS is curved, the distance between the upper side surface US and the lower side surface LS may refer to a distance between a tangent plane of the upper side surface US that is farthest from the center of the sound production component and parallel to the long-axis of the sound production component and a tangent plane of the lower side surface LS that is farthest from the center of the sound production component and parallel to the long-axis of the sound production component. In the case where the distance between the center O of the sound outlet 112 and the upper vertex M of the ear hook 1720 is a constant, if the above ratio is too small, a width dimension of the inner side surface IS may be too large, which may result in a larger overall weight of the sound production component 1710 and a small distance between the housing 10 and the ear hook 1720, thereby causing uncomfortable for the user to wear. If the above ratio is too large, the width dimension of the inner side surface IS may be too small, which may result in a small area for the transducer 22 of the sound production component 1710 to push the air, thereby causing the low sound production efficiency of the sound production component. Thus, in order to ensure that the sound production efficiency of the sound production component is sufficiently high and to improve the user's wearing comfort, and cause the projection of the sound outlet 112 on the sagittal plane can be located at least partially within the concha boat region, when the user wears the earphone 1700, a ratio of the distance between the center O of the sound outlet 112 and the upper vertex M of the ear hook 1720 to the distance between the upper and lower boundaries of the inner side surface IS is between 0.95 and 1.55. In some embodiments, a ratio of the distance between the center O of the sound outlet 112 and the upper vertex M of the ear hook 1720 to the width dimension of the housing 10 is between 1.05 and 1.45. In some embodiments, the ratio of the distance between the center O of the sound outlet 112 and the upper vertex M of the ear hook 1720 to the width dimension of the housing 10 is between 1.15 and 1.35. In some embodiments, the ratio of the distance between the center O of the sound outlet 112 and the upper vertex M of the ear hook 1720 to the width dimension of the housing 10 is between 1.20 and 1.30.

In the wearing manner shown in FIG. 17, since the sound outlet 112 is located at a position on the inner side surface IS that is relatively close to the ear canal, a ratio of the distance between the center O of the sound outlet 112 and the upper vertex M of the ear hook 1720 to a distance between the center O of the sound outlet 112 and the upper side surface US of the sound production component 1710 cannot be too large. In addition, in order to ensure that there is sufficient distance between the sound production component 1710 and the upper vertex M of the ear hook 1720 (to prevent the sound production component 1710 and the ear hook 1720 from exerting too much pressure on the ear), the ratio of the distance between the center O of the sound outlet 112 and the upper vertex M of the ear hook 1720 to the distance between the center O of the sound outlet 112 and the upper side surface US of the sound production component 1710 cannot be too small. In some embodiments, when the user wears the earphone 1700, the ratio of the distance between the center O of the sound outlet 112 and the upper vertex M of the ear hook 1720 to the distance between the center O of the sound outlet 112 and the upper side surface US of the sound production component 1710 is between 1.19 and 2.5. Preferably, the ratio of the distance between the center O of the sound outlet 112 and the upper vertex M of the ear hook 1720 to the distance between the center O of the sound outlet 112 and the upper side surface US of the sound production component 1710 is between 1.5 and 1.8.

In the wearing manner shown in FIG. 17, since the sound outlet 112 is located at a position on the inner side surface IS that is relatively close to the ear canal, the ratio of the distance between the center O of the sound outlet 112 and the upper vertex M of the ear hook 1720 to a distance between the center O of the sound outlet 112 and the lower side surface IS of the sound production component 1710 cannot be too small. In addition, in order to ensure that the sound outlet has a sufficient area (to prevent excessive acoustic impedance caused by too small area of the sound outlet), a width of the sound outlet 112 cannot be too small, and the ratio of the distance between the center O of the sound outlet 112 and the upper vertex M of the ear hook 1720 to the distance between the center O of the sound outlet 112 and the lower side surface IS of the sound production component 1710 cannot be too large. In some embodiments, when the user wears the earphone 1700, the ratio of the distance between the center O of the sound outlet 112 and the upper vertex M of the ear hook 1720 to the distance between the center O of the sound outlet 112 and the lower side surface IS of the sound production component 1710 is between 6.03 and 9.05. Preferably, the ratio of the distance between the center O of the sound outlet 112 and the upper vertex M of the ear hook 1720 to the distance between the center O of the sound outlet 112 and the lower side surface IS of the sound production component 1710 is between 7 and 8.

In some embodiments, the front cavity is set between the diaphragm of the transducer 22 and the housing 10. In order to ensure that the diaphragm has a sufficient vibration space, the front cavity may have a large depth dimension (i.e., a distance dimension between the diaphragm of the transducer 22 and the housing 10 directly opposite to it). In some embodiments, the sound outlet 112 is set on the inner side surface IS in the thickness direction Z. At this point, the depth of the front cavity may refer to a dimension of the front cavity in the Z-direction. However, too large the depth of the front cavity may lead to an increase in the dimension of the sound production component 1710 and affect the wearing comfort of the earphone 1700. In some embodiments, the depth of the front cavity may be in a range of 0.55 mm-1.00 mm. In some embodiments, the depth of the front cavity may be in a range of 0.66 mm-0.99 mm. In some embodiments, the depth of the front cavity may be in a range of 0.76 mm-0.99 mm. In some embodiments, the depth of the front cavity may be in a range of 0.96 mm-0.99 mm. In some embodiments, the depth of the front cavity may be 0.97 mm.

In order to improve the sound production effect of the earphone 1700, a resonance frequency of a structure similar to a Helmholtz resonator formed by the front cavity and the sound outlet 112 should be as high as possible, so that the overall frequency response curve of the sound production component has a wide flat region. In some embodiments, a resonance frequency $f_1$ of the front cavity may be no less than 3 kHz. In some embodiments, the resonance frequency $f_1$ of the front cavity may be no less than 4 kHz. In some embodiments, the resonance frequency $f_1$ of the front cavity may be no less than 6 kHz. In some embodiments, the resonance frequency $f_1$ of the front cavity may be no less than 7 kHz. In some embodiments, the resonance frequency $f_1$ of the front cavity may be no less than 8 kHz.

In some embodiments, the front cavity and the sound outlet 112 may be approximately regarded as a Helmholtz resonator model. The front cavity may be the cavity of the Helmholtz resonator model and the sound outlet 112 may be the neck of the Helmholtz resonator model. At this time, the resonance frequency of the Helmholtz resonator model is the resonance frequency $f_1$ of the front cavity. In the Helmholtz resonator model, the dimension of the neck (e.g., the sound outlet 112) may affect the resonance frequency f of the cavity, and the specific relationship is shown in equation (18):

$$f = \frac{c}{2\pi}\sqrt{\frac{S}{VL}}, \tag{18}$$

where c represents the speed of sound, S represents a cross-sectional area of the neck (e.g., the sound outlet 112), V represents the volume of the cavity (e.g., the front cavity), and L represents the depth of the neck (e.g., the sound outlet 112).

From equation (18), it can be seen that when the cross-sectional area S of the sound outlet 112 is increased and the depth L of the sound outlet 112 is reduced, the resonance frequency $f_1$ of the front cavity increases and moves toward high frequency.

In some embodiments, a total air volume of the sound outlet 112 forms a sound mass that can resonate with a system (e.g., the Helmholtz resonator) to produce a low-frequency output. Thus, a relatively small sound mass may affect the low-frequency output of the Helmholtz resonator model. In turn, the dimension of the sound outlet 112 also affects the sound mass Ma of the sound outlet 112, and the specific relationship is shown in equation (19):

$$M_a = \frac{\rho L}{S}, \tag{19}$$

where ρ represents an air density, S represents the cross-sectional area of the sound outlet 112, and L represents the depth of the sound outlet 112.

From equation (19), it can be seen that when the cross-sectional area S of the sound outlet 112 is increased and the depth L is reduced, the sound mass Ma of the sound outlet 112 decreases.

Combining equation (18) and equation (19), it can be seen that the larger a value of a ratio S/L of the cross-sectional area S to the depth L of the sound outlet 112 is, the larger the resonance frequency $f_1$ of the front cavity is, and the smaller the sound mass Ma of the sound outlet 112 is. Therefore, the ratio S/L of the cross-sectional area S to the depth L of the sound outlet 112 needs to be in a suitable range, specific descriptions can be seen, for example, in FIG. 19A, FIG. 19B, and FIG. 20B.

Figure 19A:
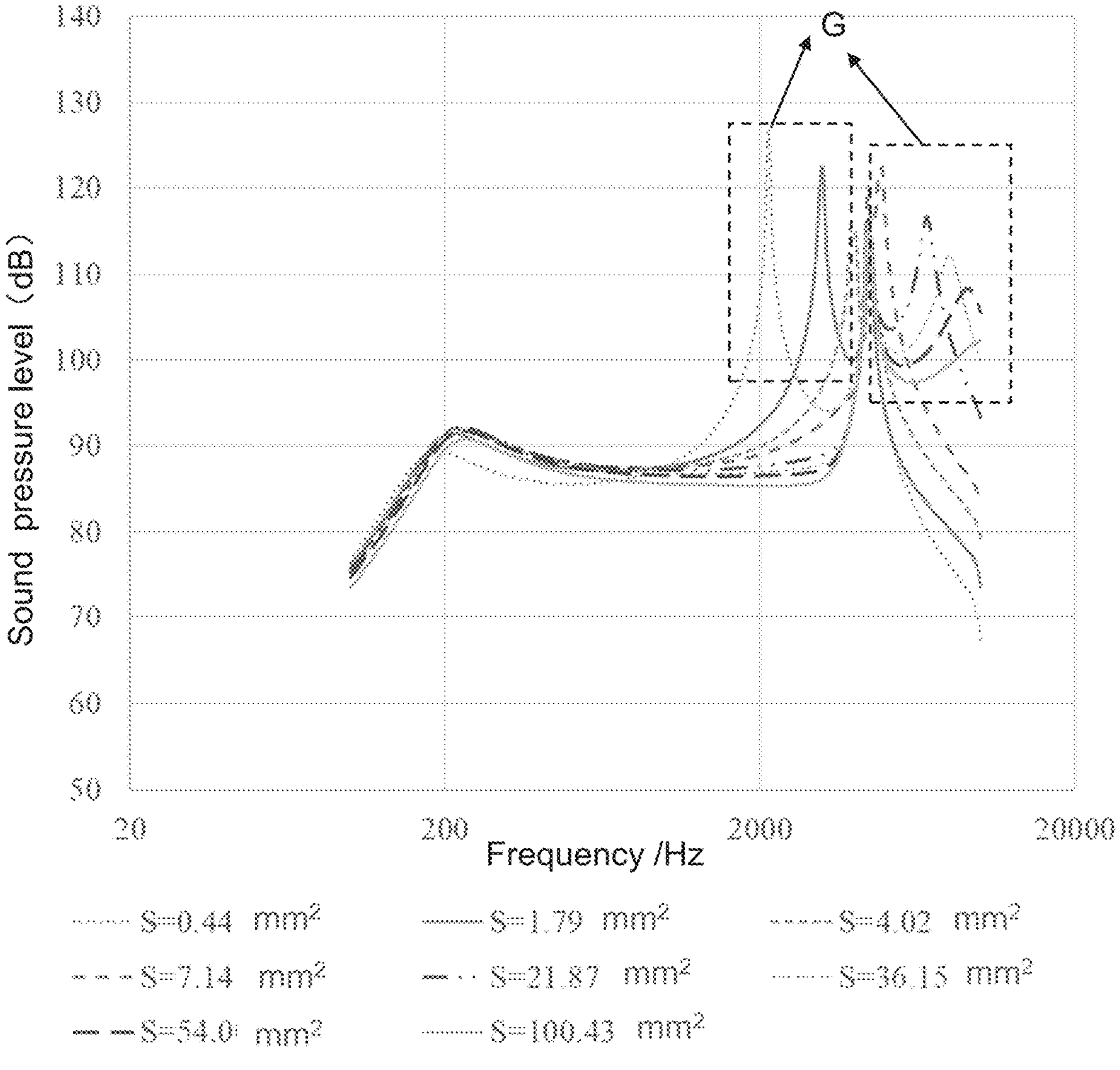
FIG. 19A is a frequency response curve diagram of an earphone corresponding to sound outlets of different cross-sectional areas at a certain aspect ratio according to some embodiments of the present disclosure.

FIG. 19A is a frequency response curve diagram of an earphone corresponding to sound outlets of different cross-sectional areas at a certain aspect ratio according to some embodiments of the present disclosure. FIG. 19A illustrates frequency response curves corresponding to the earphone 1700 when the other structures (e.g., the pressure relief hole 113, the volume of the rear cavity, etc.) are fixed and when the aspect ratio of the sound outlet is fixed, and when the cross-sectional area of the sound outlet is in a range of 0.44 $mm^2$ to 100.43 $mm^2$. As can be seen from FIG. 19A, under the above conditions, as the cross-sectional area S of the sound outlet 112 gradually increases, the resonance frequency $f_1$ (i.e., a frequency corresponding to the resonance peak in the dotted circle G) corresponding to the front cavity in the frequency response curve of the earphone 1700 gradually shifts to high frequency, and then the resonance frequency corresponding to the rear cavity remains at about 4.5 kHz. Specifically, as the cross-sectional area S of the sound outlet 112 increases, the resonance peak of the front cavity gradually moves to high frequency. When the resonance peak of the front cavity moves to about 4.5 kHz, the resonance frequencies of the front cavity and the rear cavity may be basically equal, and during this process, the peak value of the resonance peak remains basically unchanged. After the resonance peak of the front cavity moves to 4.5 kHz, if the cross-sectional area S of the sound outlet 112 continues to be increased, the peak value of the resonance peak of the front cavity shows a clear tendency to gradually decrease. Therefore, in some embodiments, in order to make the frequency response curve of the earphone 1700 have a wide flat region, the cross-sectional area S of the sound outlet 112 may be larger than 2.87 $mm^2$. Preferably, in order to make the frequency response curve of the earphone 1700 flat in a range of 100 Hz to 2.3 kHz, the cross-sectional area S of the sound outlet 112 may be larger than 4.0 $mm^2$. Preferably, in order to make the frequency response curve of the earphone 1700 flat in a range from 100 Hz to 3.3 kHz, the cross-sectional area S of the sound outlet 112 may be larger than 7.0 $mm^2$.

Further, within a certain cross-sectional area S of the sound outlet 112, as the cross-sectional area S of the sound outlet 112 increases, the resonance peak of the front cavity gradually decreases while moving to high frequency. Therefore, in some embodiments, in order to improve the sound quality of the earphone 1700 as well as to facilitate the adjustment of EQ, the frequency response of the earphone 1700 in a high frequency range (e.g., 4.5 kHz to 9 kHz) needs to be sufficient, thus the cross-sectional area S of the sound outlet 112 may be less than 54 $mm^2$. Preferably, in order to make the frequency response curve of the earphone 1700 sufficient in a range of 4.5 kHz~8 kHz, the cross-sectional area S of the sound outlet 112 may be smaller than 36.15 $mm^2$. More preferably, in order to make the frequency response curve of the earphone 1700 sufficient in a range from 4.5 kHz to 6.5 kHz, the cross-sectional area S of the sound outlet 112 may be less than 21.87 $mm^2$. In the present disclosure, for ease of description, the cross-sectional area S of the sound outlet 112 may refer to an area of an outer opening of the sound outlet 112 (i.e., an opening area of the sound outlet 112 on the inner side surface). It should be known that in some other embodiments, the cross-sectional area S of the sound outlet 112 may also refer to an area of an inner opening of the sound outlet 112, or an average of the area of the inner opening and the area of the outer opening of the sound outlet 112.

Figure 19B:
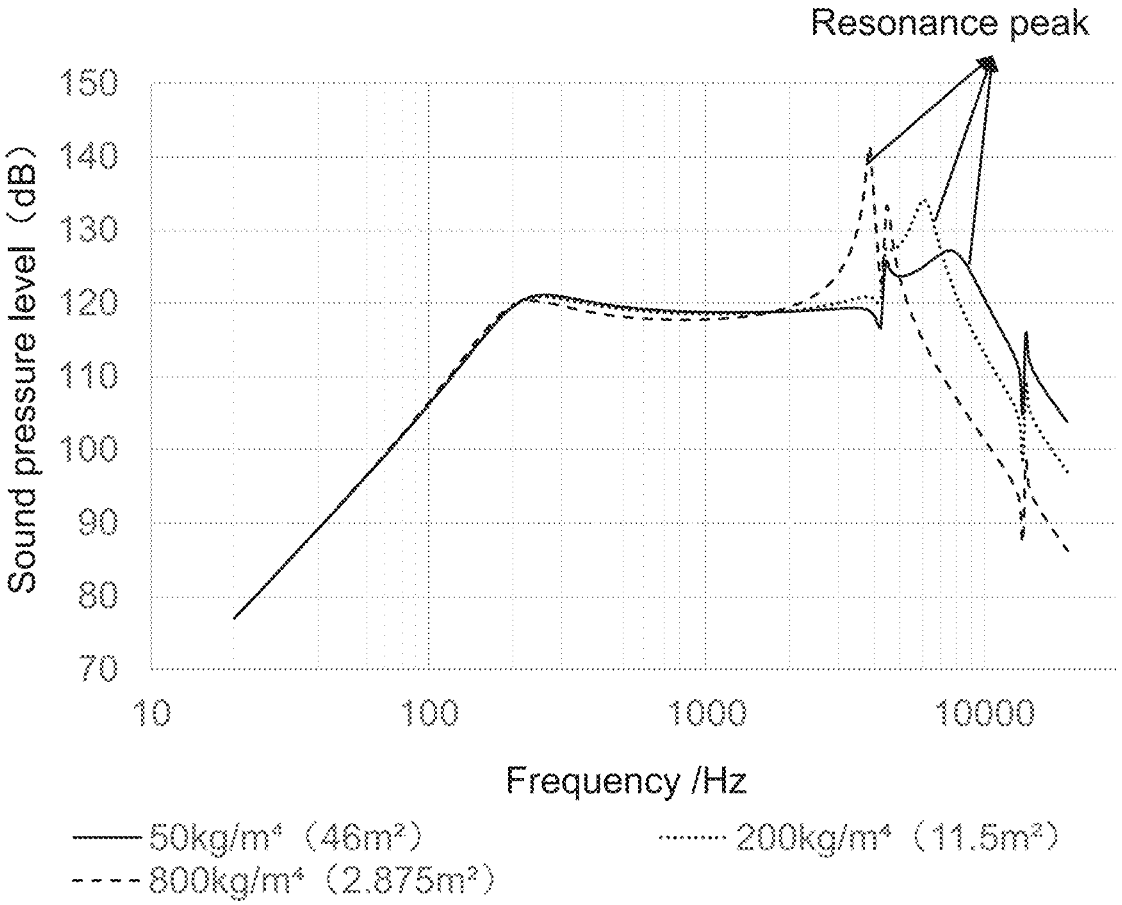
FIG. 19B is a frequency response curve diagram of a front cavity corresponding to different cross-sectional areas of sound outlets according to some embodiments of the present disclosure.

FIG. 19B is a frequency response curve diagram of a front cavity corresponding to different cross-sectional areas of sound outlets according to some embodiments of the present disclosure. As shown in FIG. 19B, when the cross-sectional area S of the sound outlet 112 increases from 2.875 $mm^2$ to 46.10 $mm^2$, the sound mass $M_a$ of the sound outlet 112 decreases from 800 $kg/m^4$ to 50 $kg/m^4$, and the resonance frequency $f_1$ of the front cavity gradually increases from about 4 kHz to about 8 kHz. It should be noted that the parameters, such as 200 $kg/m^4$ and 800 $kg/m^4$ shown in FIG. 19B represent only a theoretical sound mass of the sound outlet 112, and there may be an error with an actual sound mass of the sound outlet 112.

In order to improve the acoustic output of the earphone 1700, while increasing the resonance frequency $f_1$ of the front cavity and ensuring that the sound mass $M_a$ of the sound outlet 112 is large enough, the cross-sectional area S of the sound outlet 112 needs to have a suitable range of values. In addition, in the actual design, if the cross-sectional area of the sound outlet 112 is too large, it may have a certain impact on the appearance, structural strength, water and dust resistance and other aspects of the earphone 1700. In some embodiments, the cross-sectional area S of the sound outlet 112 may be in a range of 2.87 mm2 to 46.10 $mm^2$. In some embodiments, the cross-sectional area S of the sound outlet 112 may be in a range of 2.875 $mm^2$-46 $mm^2$. In some embodiments, the cross-sectional area S of the sound outlet 112 may be in a range of 10 $mm^2$-30 $mm^2$. In some embodiments, the cross-sectional area S of the sound outlet 112 may be 25.29 $mm^2$. In some embodiments, the cross-sectional area S of the sound outlet 112 may be in a range of 25 $mm^2$-26 $mm^2$.

In some embodiments, in order to increase the wearing stability of the earphone 1700, the area of the inner side surface IS of the sound production component 1710 needs to be adapted to the dimension of the ear. At the same time, the area of the sound outlet should not be too large, otherwise, it may affect the waterproof and dustproof structure at the sound outlet and the stability of the support structure. The area of the inner side surface IS should not be too small, otherwise, it may affect the area of the transducer to push the air. In some embodiments, the ratio of the cross-sectional area S of the sound outlet 112 to the area of the inner side surface IS may be in a range of 0.015 to 0.25. In some embodiments, the ratio of the cross-sectional area S of the sound outlet 112 to the area of the inner side surface IS may be in a range of 0.02 to 0.2. In some embodiments, the ratio of the cross-sectional area S of the sound outlet 112 to the area of the inner side surface IS may be in a range of 0.06 to 0.16. In some embodiments, the ratio of the cross-sectional area S of the sound outlet 112 to the area of the inner side surface IS may be in a range of 0.1 to 0.12.

In some embodiments, the width dimension of the housing 10 along the Y-direction may be in a range of 11 mm-16 mm. In some embodiments, the width dimension of the housing 10 along the Y-direction may be in a range of 11 mm-15 mm. In some embodiments, the width dimension of the housing 10 along the Y-direction may be in a range of 13 mm-14 mm. In some embodiments, a ratio of the dimension of the housing 10 along the X-direction to the dimension of the housing 10 along the Y-direction may be in a range of 1.2-5. In some embodiments, the ratio of the dimension of the housing 10 along the X-direction to the dimension of the housing 10 along the Y-direction may be in a range of 1.4-4. In some embodiments, the ratio of the dimension of the housing 10 along the X-direction to the dimension of the housing 10 along the Y-direction may be in a range of 1.5-2. In some embodiments, the length dimension of the housing 10 along the X-direction may be in a range of 15 mm-30 mm. In some embodiments, the length dimension of the housing 10 along the X-direction may be in a range of 16 mm-28 mm. In some embodiments, the length dimension of the housing 10 along the X-direction may be in a range of 19 mm-24 mm. In some embodiments, in order to avoid the large volume of the housing 10 affecting the wearing comfort of the earphone 1700, a thickness dimension of the housing 10 along the Z-direction may be in a range of 5 mm-20 mm. In some embodiments, the thickness dimension of the housing 10 along the Z-direction may be in a range of 5.1 mm-18 mm. In some embodiments, the thickness dimension of the housing 10 along the Z-direction may be in a range of 6 mm-15 mm. In some embodiments, the thickness dimension of the housing 10 along the Z-direction may be in a range of 7 mm-10 mm. In some embodiments, an area of the inner surface IS of the housing 10 (in the case where the inner surface IS is rectangular, the area is equal to a product of the length dimension and the width dimension of the housing 10) may be 90 $mm^2$-560 $mm^2$. In some embodiments, the area of the inner side surface IS may be considered to approximate the projection area of the transducer along the Z-direction. For example, the area of the inner side surface IS may differ by less than 10% from the projection area of the transducer along the Z-direction. In some embodiments, the area of the inner side surface IS may be 150 $mm^2$-360 $mm^2$. In some embodiments, the area of the inner side surface IS may be 160 $mm^2$ to 240 $mm^2$. In some embodiments, the area of the inner side surface IS may be 180 $mm^2$-200 $mm^2$.

In some embodiments, consisting that the inner side surface IS may need to be in contact with the ear, in order to improve the wearing comfort, the inner side surface IS may be designed as a non-planar structure. For example, an edge region of the inner side surface IS has a certain curvature relative to a central region, or a region on the inner side surface IS near the free end FE is provided with a convex structure to better abut against with the ear region, etc. In this case, in order to better reflect the influence of the cross-sectional area of the sound outlet 112 on the wearing stability and sound production efficiency of the earphone 1700, the ratio of the cross-sectional area S of the sound outlet 112 to the area of the inner side surface IS may be replaced with a ratio of the cross-sectional area S of the sound outlet 112 to the projection area of the inner side surface IS in the vibration direction of the diaphragm (i.e., the Z-direction in FIG. 17). In some embodiments, a ratio of the cross-sectional area S of the sound outlet 112 to a projection area of the inner surface IS along the vibration direction of the diaphragm may be in a range of 0.016 to 0.255. Preferably, the ratio of the cross-sectional area S of the sound outlet 112 to a projection area of the inner surface IS along the vibration direction of the diaphragm may be in a range of 0.022 to 0.21.

In some embodiments, a projection area of the diaphragm of the transducer in its vibration direction may be equal to or slightly less than the projection area of the inner side surface IS along the vibration direction of the diaphragm. In this case, a ratio of the cross-sectional area S of the sound outlet 112 to the projection area of the diaphragm in its vibration direction may be in a range of 0.016 to 0.261. Preferably, the ratio of the cross-sectional area S of the sound outlet 112 to a projection area of the inner surface IS along the vibration direction of the diaphragm may be in a range of 0.023 to 0.23.

In some embodiments, the shape of the sound outlet 112 also has an effect on an acoustic resistance of the sound outlet 112. The narrower and longer the sound outlet 112 is, the higher the acoustic resistance of the sound outlet 112 is, which is not conducive to the acoustic output of the front cavity. Therefore, in order to ensure that the sound outlet 112 has a suitable acoustic resistance, a ratio of the long-axis dimension to the short-axis dimension of the sound outlet 112 (also called an aspect ratio of the sound outlet 112) needs to be within a preset appropriate range.

In some embodiments, the shape of the sound outlet 112 may include, but is not limited to, a circle, an oval, a runway shape, etc. For the sake of description, the following exemplary illustration is provided with the sound outlet 112 in a runway shape as an example. In some embodiments, as shown in FIG. 18, the sound outlet 112 may adopt the runway shape, wherein the ends of the runway shape may be minor arced or semicircular. In this case, the long-axis dimension of the sound outlet 112 may be a maximum dimension (e.g., the long-axis dimension as shown in FIG. 18) of the sound outlet 112 along the X-direction, and the short-axis dimension (e.g., the short-axis dimension as shown in FIG. 18) of the sound outlet 112 may be a maximum dimension of the sound outlet 112 along the Y-direction.

Figure 20A:
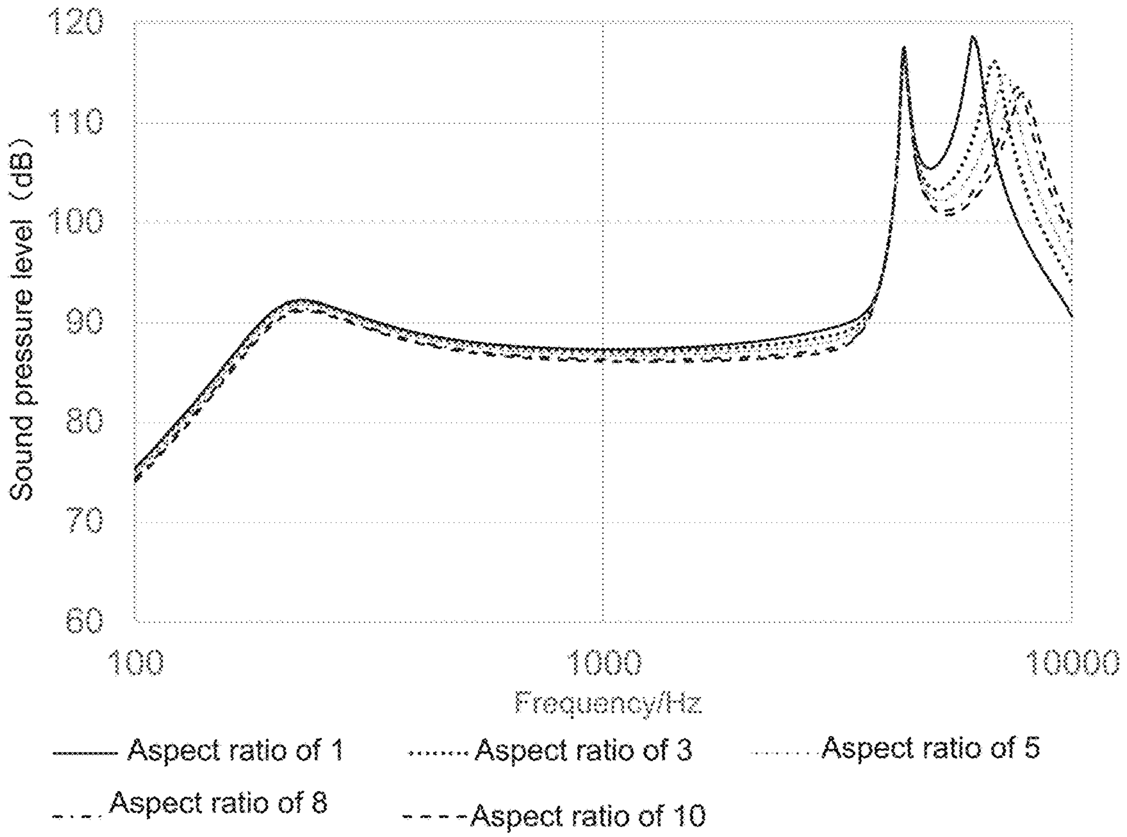
FIG. 20A is a frequency response curve diagram of an earphone corresponding to different aspect ratios of sound outlets according to some embodiments of the present disclosure.

FIG. 20A is a frequency response curve diagram of an earphone corresponding to different aspect ratios of sound outlets according to some embodiments of the present disclosure. FIG. 20A illustrates a frequency response curve of the earphone corresponding to a sound outlet with aspect ratios of 1, 3, 5, 8, and 10, respectively when the other structures (e.g., the pressure relief hole 113, the volume of the rear cavity, etc.) are fixed and the area of the sound outlet is a constant.

As can be seen from FIG. 20A, when the cross-sectional area of the sound outlet 112 is a constant, as the aspect ratio of the sound outlet 112 increases, the resonance frequency $f_1$ of the resonance peak of the front cavity gradually moves toward high frequency, and the intensity of the resonance peak gradually decreases. Therefore, when the cross-sectional area of the sound outlet 112 is a constant, in order to ensure that the intensity of the resonance peak of the front cavity is strong enough, the ratio of the long-axis dimension of the sound outlet 112 to the short-axis dimension of the sound outlet 112 may be in a range from 1 to 10. In some embodiments, the ratio of the long-axis dimension of the sound outlet 112 to the short-axis dimension of the sound outlet 112 may be in a range from 2 to 8. In some embodiments, the ratio of the long-axis dimension of the sound outlet 112 to the short-axis dimension of the sound outlet 112 may be in a range from 2 to 4. In some embodiments, the long-axis dimension of the sound outlet 112 may be 7.67 mm and the short-axis dimension of the sound outlet 112 may be 3.62 mm.

Figure 20B:
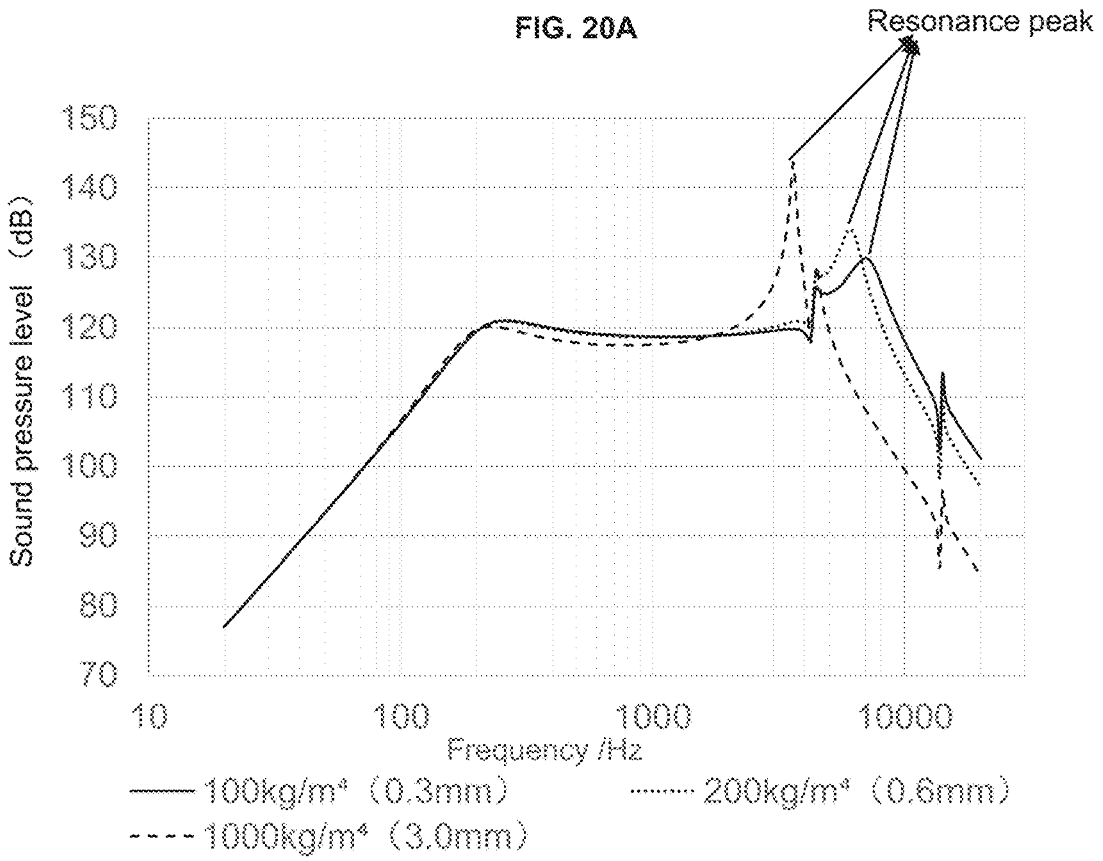
FIG. 20B is a frequency response curve diagram of a front cavity corresponding to different depths of sound outlets according to some embodiments of the present disclosure.

FIG. 20B is a frequency response curve diagram of a front cavity corresponding to different depths of sound outlets according to some embodiments of the present disclosure. As shown in FIG. 20B, when the depth L of the sound outlet 112 increases from 0.3 mm to 3 mm, the sound mass Ma of the sound outlet 112 increases from 100 $kg/m^4$ to 1000 $kg/m^4$, and the resonance frequency $f_1$ of the front cavity decreases from about 7 kHz to about 3.7 kHz.

In order to ensure that the front cavity has a sufficiently large resonance frequency, according to equation (18), the depth L of the sound outlet 112 is taken to be as small as possible. However, since the sound outlet 112 is set on the housing 111, the depth of the sound outlet 112 is the thickness of the side wall of the housing 111. When the thickness of the housing 111 is too small, the structural strength of the earphone 1700 may be affected, and the corresponding manufacturing process is more difficult. In some embodiments, the depth L of the sound outlet 112 may be in a range of 0.3 mm-3 mm. In some embodiments, the depth L of the sound outlet 112 may be in a range of 0.3 mm-2 mm. In some embodiments, the depth L of the sound outlet 112 may be 0.3 mm. In some embodiments, the depth L of the sound outlet 112 may be 0.6 mm.

In some embodiments, according to equation (18), in the case where the volume of the front cavity is not easily changed, the larger the ratio $S/L^2$ of the cross-sectional area S of the sound outlet 112 to the square of the depth L is, the higher the resonance frequency of the front cavity is and the better the sound emitted from the sound outlet is in the low and middle frequency range. However, since the cross-sectional area S of the sound outlet 112 should not be too large, and the depth L (the thickness of the housing 111) should not be too small, in some embodiments, the ratio $S/L^2$ of the cross-sectional area S of the sound outlet 112 to the square of the depth L may be in a range of 0.31 to 512.2. In some embodiments, the ratio $S/L^2$ of the cross-sectional area S of the sound outlet 112 to the square of the depth L may be in a range of 1-400. In some embodiments, the ratio $S/L^2$ of the cross-sectional area S of the sound outlet 112 to the square of the depth L may be in a range of 3-300. In some embodiments, the ratio $S/L^2$ of the cross-sectional area S of the sound outlet 112 to the square of the depth L may be in a range of 5-200. In some embodiments, the ratio $S/L^2$ of the cross-sectional area S of the sound outlet 112 to the square of the depth L may be in a range of 10-50.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. An earphone, comprising:

a sound production component including a housing and a transducer, the transducer residing inside the housing and being configured to generate vibrations, the vibrations producing a sound wave inside the housing; and an ear hook, in a wearing state, the ear hook being used to place the sound production component at a position near an ear canal but not blocking the ear canal, wherein the housing is provided with a first sound guiding hole on an inner side surface towards the auricle for guiding the sound wave inside the housing through the first sound guiding hole to the ear canal and to surrounding environment, and a distance between a center of the first sound guiding hole and an upper vertex of the ear hook is in range of 17.5 mm to 27.0 mm.

2. The earphone of claim 1, wherein in the wearing state, the housing is at least partially located at an antihelix and a distance from the center of the first sound guiding hole to a lower side surface of the sound production component is in a range of 2.3 mm to 3.6 mm.

3. The earphone of claim 2, wherein a distance from the center of the first sound guiding hole to a rear side surface of the sound production component is in a range of 9.5 mm to 15.0 mm.

4. The earphone of claim 1, wherein in the wearing state, a ratio of the distance between the center of the first sound guiding hole and the upper vertex of the ear hook to a distance between an upper boundary and a lower boundary of the inner side surface is in a range of 0.95 to 1.55.

5. The earphone of claim 4, wherein in the wearing state, a ratio of the distance between the center of the first sound guiding hole and the upper vertex of the ear hook to a distance from the center of the first sound guiding hole to an upper side surface of the sound production component is in a range of 1.19 to 2.50.

6. The earphone of claim 1, wherein a distance from the center of the first sound guiding hole to a plane in which the ear hook is located is in a range of 3 mm to 6 mm.

7. The earphone of claim 1, wherein a ratio of an area of the first sound guiding hole to an area of the inner side surface is in a range of 0.015 to 0.25.

8. The earphone of claim 7, wherein the area of the first sound guiding hole is in a range of 2.87 $mm^2$ to 46.10 $mm^2$.

9. The earphone of claim 7, wherein the area of the inner side surface is in a range of 160 $mm^2$ to 240 $mm^2$.

10. The earphone of claim 1, wherein a ratio of a long-axis dimension of the first sound guiding hole to a short-axis dimension of the first sound guiding hole is in a range of 1 to 10.

11. The earphone of claim 10, wherein a ratio of a long-axis dimension of the first sound guiding hole to a short-axis dimension of the first sound guiding hole is in a range of 2 to 4.

12. The earphone of claim 1, wherein the sound wave transmitted to the surrounding environment forms a leaked sound wave in a target region, the housing is further provided with a second sound guiding hole for guiding a sound wave in the target region, the first sound guiding hole and the second sound guiding hole are located on different side walls of the housing, and the guided sound wave of the second sound guiding hole and the leaked sound wave of the first sound guiding hole have different phases.

13. The earphone of claim 12, wherein the second sound guiding hole is located on the upper side surface of the housing.

14. The earphone of claim 12, wherein the first sound guiding hole or the second sound guiding hole includes a damping layer, the damping layer being configured to adjust the phase of the sound wave of the first sound guiding hole or the second sound guiding hole.

15. The earphone of claim 14, wherein the damping layer includes at least one of: a tuning paper, a tuning cotton, a nonwoven fabric, a silk, a cotton, a sponge, or a rubber.

16. The earphone of claim 12, wherein a shape of the first sound guiding hole or the second sound guiding hole includes circle, ellipse, quadrangle, rectangle, or linear.

17. The earphone of claim 12, wherein the sound production component further includes:

at least one acoustic route coupled to at least one sound guiding hole of the first sound guiding hole or the second sound guiding hole, wherein a guided sound wave of the at least one sound guiding hole is propagated to the at least one sound guiding hole along the acoustic route, and the at least one acoustic route is configured to adjust a frequency of the guided sound wave of the at least one sound guiding hole.

18. The earphone of claim 17, wherein the acoustic route is configured to adjust a frequency of the guided sound wave of the at least one sound guiding hole by filtering sound waves in target frequencies.

19. The earphone of claim 17, wherein the acoustic route includes one or more lumen structures.

20. The earphone of claim 17, wherein the acoustic route includes one or more resonance cavities.

* * * * *